US008891360B2

(12) United States Patent
Ahuja et al.

(10) Patent No.: US 8,891,360 B2
(45) Date of Patent: Nov. 18, 2014

(54) OPTIMAL SEGMENT IDENTIFICATION FOR SHARED MESH PROTECTION

(71) Applicant: Infinera Corp., Annapolis Junction, MD (US)

(72) Inventors: Satyajeet S. Ahuja, Cupertino, CA (US); Rajan Rao, Cupertino, CA (US); Biao Lu, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 62 days.

(21) Appl. No.: 13/664,129

(22) Filed: Oct. 30, 2012

(65) Prior Publication Data

US 2013/0294228 A1 Nov. 7, 2013

Related U.S. Application Data

(60) Provisional application No. 61/642,896, filed on May 4, 2012.

(51) Int. Cl.
*H04L 12/26* (2006.01)
*H04L 12/721* (2013.01)
*H04L 12/24* (2006.01)
*H04L 12/707* (2013.01)
*H04L 12/703* (2013.01)

(52) U.S. Cl.
CPC ............ *H04L 41/0654* (2013.01); *H04L 45/22* (2013.01); *H04L 45/12* (2013.01); *H04L 45/28* (2013.01)
USPC ........................................................ 370/225

(58) Field of Classification Search
None
See application file for complete search history.

(56) References Cited

U.S. PATENT DOCUMENTS

| 2003/0223373 | A1 | 12/2003 | Nakamura et al. |
| 2004/0190444 | A1* | 9/2004 | Trudel et al. ................... 370/224 |
| 2004/0205237 | A1* | 10/2004 | Doshi et al. .................... 709/241 |
| 2005/0188242 | A1* | 8/2005 | Rabbat et al. ...................... 714/4 |
| 2006/0203720 | A1* | 9/2006 | Kano .............................. 370/228 |
| 2007/0036073 | A1* | 2/2007 | Yamada et al. ................ 370/225 |
| 2010/0296808 | A1* | 11/2010 | Hinderthur ........................ 398/5 |
| 2011/0075549 | A1* | 3/2011 | Lu et al. .......................... 370/216 |
| 2012/0026867 | A1* | 2/2012 | Sultan et al. .................... 370/228 |

OTHER PUBLICATIONS

E. W. Dijkstra, "A note on two problems in connexion with graphs", Numerische Mathematik, 1959, pp. 269-271, vol. 1.

* cited by examiner

*Primary Examiner* — Anh-Vu Ly
*Assistant Examiner* — Gustavo Lopez-Vargas
(74) *Attorney, Agent, or Firm* — Dunlap Codding PC; David L. Soltz

(57) ABSTRACT

Nodes and methods are disclosed, including, circuitry of a source node in a mesh network retrieving information indicative of network topology; identifying a working path from the source node to a destination node; identifying potential protection segments of the working path, wherein a potential protection segment has at least one disjoint protection path available for the segment; creating a hypothetical network topology comprising the nodes of the working path and hypothetical links between the nodes, wherein the hypothetical links represents potential protection segments identified, and the links are assigned a weight; executing a Shortest Path Algorithm on the hypothetical network topology; identifying as optimal segments the potential protection segments represented by the hypothetical links determined as being in the shortest path by the Shortest Path Algorithm; generating and transmitting a message communicating need for resources in case of failure of the optimal segments.

18 Claims, 22 Drawing Sheets

OPTIMAL SEGMENT IDENTIFICATION FOR SHARED MESH PROTECTION

FIELD OF THE DISCLOSURE

The disclosure generally relates to methods and apparatuses for optimizing protection resources for shared mesh protection. More particularly the disclosure relates to identification of preferred segments on the working path for protection paths for shared mesh protection in mesh networks. Though the methodologies set forth herein are in the context of traffic engineering (TE) routing in optical transport networks (OTN), such methodologies may be applied to any transport networks that utilize protection and recovery provisioning.

BACKGROUND

Traffic Engineering (TE) is a technology that is concerned with performance optimization of operational networks. In general, Traffic Engineering includes a set of applications mechanisms, tools, and scientific principles that allow for measuring, modeling, characterizing and control of user data traffic in order to achieve specific performance objectives.

A circuit switched network usually includes multiple switch nodes (also referred to as "nodes") which are arranged in a topology referred to in the art as a "mesh network". Within the mesh network, user traffic can be transported between any two locations using predefined connections specifying particular links and/or switch nodes for conveying the user traffic.

The switch nodes in the mesh network are each provided with a control module. The control modules of the switch nodes function together to aid in the control and management of the circuit switched networks. The control modules can run a variety of protocols for conducting the control and management of the circuit switched networks. One prominent protocol is referred to in the art as "Generalized Multiprotocol Label Switching (GMPLS)".

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing is when two or more signals or bit streams are transferred over a common channel.

Generalized Multiprotocol Label Switching includes multiple types of label switched paths including protection and recovery mechanisms which specifies predefined (1) working connections within a mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. Working connections may also be referred to as working paths. Protecting connections may also be referred to as protecting paths and/or protection paths. A first node of a path may be referred to as a headend node or a source node. A last node of a path may be referred to as a tailend node or end node or destination node. Data is initially transmitted over the working connection (such as an optical channel data unit label switched path) and then, when a working connection fails, the headend node or tailend node activates one of the protecting connections for redirecting data within the mesh network.

The set up and activation of the protecting connections may be referred to as shared mesh restoration or shared mesh protection (SMP). Shared Mesh Protection (SMP) is a common protection and recovery mechanism in transport networks, where multiple paths can share the same set of network resources for protection purposes. Resources such as nodes and communication links in protecting connections are typically shared by multiple working connections that are not affected by the same failure, thus increasing efficient use of network resources.

However, current systems inefficiently utilize the provisioned capacity of a mesh network when determining protecting connections, especially for large-scale networks. For example, the working path may not be divided into the optimal segments, where optimal segment choice would provide the least costly alternate path through the network in case of failure in the working path. Systems and methods are needed to determine preferred segments of the working path for segment shared mesh protection based on the network condition and topology, and for implementation of such protection, in order to optimize network capacity and knowledge of failure locations.

SUMMARY

A method and system are disclosed. The problem of inefficient resource utilization for shared mesh protection in mesh networks is addressed through identification of potential protection segments on the working path, identification of disjoint protection paths of the segments, determination of optimal segments of a working path, and implementation of segment-shared-mesh-protection for a connection based on condition and topology of the network including the determined optimal segments. In one embodiment, segment-shared-mesh-protection can be implemented with polynomial scalability.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 7b is a flow diagram of the sub-steps of step 150 of FIG. 7a.

DETAILED DESCRIPTION

Figure 1:
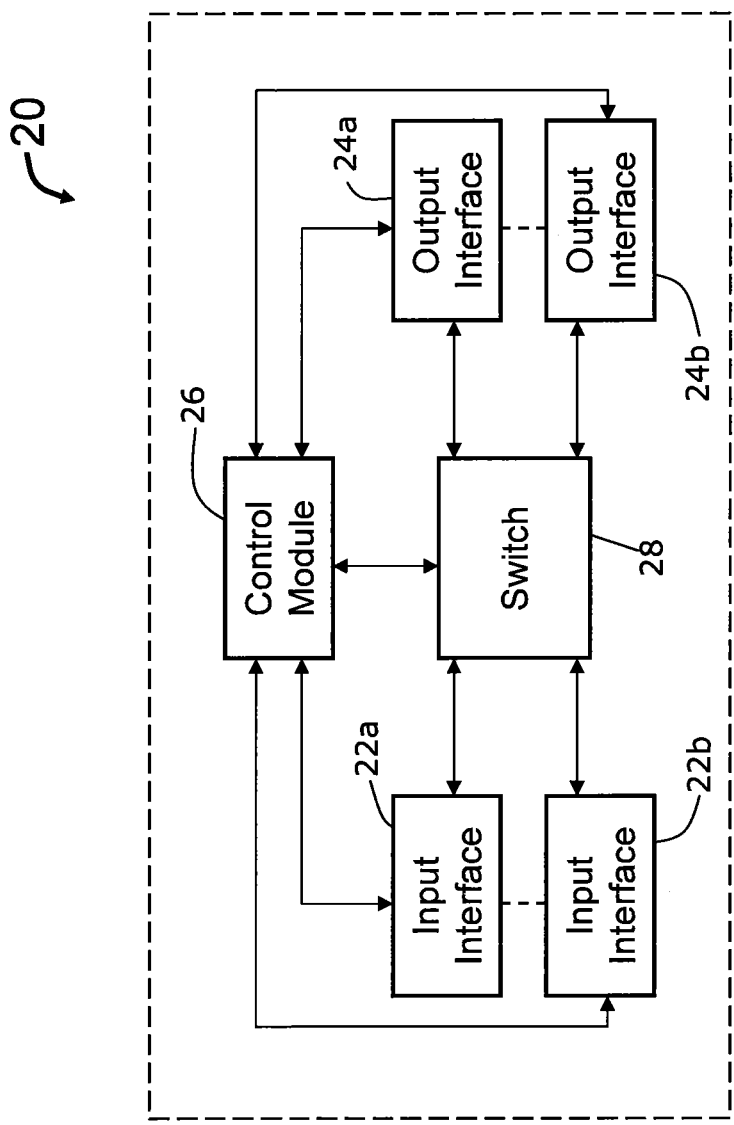
FIG. 1 is a block diagram of an exemplary node constructed in accordance with the present disclosure for communicating via a mesh network.

The following detailed description refers to the accompanying drawings. The same reference numbers in different drawings may identify the same or similar elements.

The mechanisms proposed in this disclosure circumvent the problems described above. The present disclosure describes methods and systems for retrieving, by circuitry of a source node in a mesh network, information indicative of topology of the mesh network, the information stored on a non-transitory memory, wherein the source node is a first node in a connection through the mesh network; identifying from the information, by circuitry of the source node, a working path from the source node to a destination node in the mesh network, wherein the working path carries data through the mesh network when there is no failure in the mesh network; identifying from the information, by circuitry of the source node, potential protection segments of the working path, wherein a segment is a sub-section of the working path comprising at least two nodes and one communication link on the working path, wherein a potential protection segment has at least one disjoint protection path available for the segment, wherein the disjoint protection path does not use communication links used by the working path; creating, by circuitry of the source node, a hypothetical network topology comprising the nodes of the working path and hypothetical links between the nodes, wherein each hypothetical link represents one of the potential protection segments identified, wherein the hypothetical links are assigned a weight; executing, by circuitry of the source node, a Shortest Path Algorithm on the hypothetical network topology to determine a shortest path through the hypothetical network topology; identifying as optimal segments, by circuitry of the source node, the potential protection segments represented by the hypothetical links determined as being in the shortest path by the Shortest Path Algorithm; generating, by circuitry of the source node, at least one signal comprising at least one message; and transmitting the signal comprising the message, by circuitry of the source node, through an output interface of the source node, to an input interface of at least one node in the mesh network, wherein the message communicates a need for resources in case of failure of the optimal segment of the working path. The method may have a polynomial complexity represented by $O(N^2 \log(N))$.

In one embodiment, information retrieval and execution of algorithms may be conducted outside of the node and resulting information may be provided to the node. For example, one or more processor may conduct the steps of determining or retrieving information indicative of topology of the mesh network, the information stored on a non-transitory memory; identifying from the information a working path from the source node to a destination node in the mesh network, wherein the working path carries data through the mesh network when there is no failure in the mesh network; identifying from the information potential protection segments of the working path, wherein a segment is a sub-section of the working path comprising at least two nodes and one communication link on the working path, wherein a potential protection segment has at least one disjoint protection path available for the segment, wherein the disjoint protection path does not use communication links used by the working path; creating a hypothetical network topology comprising the nodes of the working path and hypothetical links between the nodes, wherein each hypothetical link represents one of the potential protection segments identified, wherein the hypothetical links are assigned a weight; executing a Shortest Path Algorithm on the hypothetical network topology to determine a shortest path through the hypothetical network topology; and identifying as optimal segments the potential protection segments represented by the hypothetical links determined as being in the shortest path by the Shortest Path Algorithm.

In one embodiment, the hypothetical network topology is in the form of a reachability graph comprising the nodes of the working path and the hypothetical links between the nodes.

In one embodiment, the method may further comprise identifying a number of the potential protection segments such that the hypothetical network topology has a number of hypothetical links that form a path between the source node and the destination node.

In one embodiment, at least one signal is a first signal, and the method further comprises generating, by circuitry of the source node, at least one second signal comprising at least one message; and transmitting the second signal comprising the message, by circuitry of the source node, through the output interface of the source node, to input interfaces of nodes in the disjoint protection paths of the optimal segments and to input interfaces of nodes in the working path, wherein the message communicates information indicative of network topology based on the optimal segments identified.

In one embodiment, the weight assigned to the hypothetical link is indicative of at least one of hop count, bandwidth, cost, length, or latency of the link, of the disjoint protection path of the potential protection segment represented by the hypothetical link.

In one embodiment the step of identifying as optimal segments, by circuitry of the source node, the potential protection segments represented by the hypothetical links determined as the shortest path has a polynomial complexity of $O(N^2 \log(N))$.

In one embodiment, the Shortest Path Algorithm may be an algorithm that provides a shortest path between a first node and a second node in the network. The Shortest Path Algorithm may be Dijkstra's Algorithm. The Shortest Path Algorithm may be Bellman Ford's Algorithm. Of course, it should be understood that any algorithm that provides a shortest path between two nodes on a topology can be used.

In one embodiment, the method may further comprises executing, by circuitry of the source node in the mesh network, a graph search algorithm to determine network topology of the mesh network including the working path of a first connection through the mesh network. Further, the graph search algorithm may be one of Dijkstra's Algorithm or Bellman Ford's Algorithm.

DEFINITIONS

If used throughout the description and the drawings, the following short terms have the following meanings unless otherwise stated:

CSPF stands for Constrained Shortest Path First, also referred to as Constrained SPF. CSPF is a network protocol which utilizes algorithms for choosing a network path that is the shortest path fulfilling a set of constraints.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

The term "hop", as used herein, refers to a move, or possible move, of data from one node to another node in a mesh network. The number of hops (or hop count) of a connection may be indicative of the number of moves of data from the start node to the end node in the network. For example, in a connection from node A through nodes B and C to node D, the hop count would be three (A to B, B to C, and C to D).

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OSPF stands for "Open Shortest Path First." OSPF is a network routing protocol. OSPF is further defined in RFC 2328 and RFC 5340. OSPF-TE stands for OSPF Traffic Engineering. OSPF-TE is an extension of the OSPF network routing protocol for use with GMPLS incorporating traffic engineering.

OTN stands for Optical Transport Network which includes a set of optical switch nodes which are connected by optical fiber links. ITU-T recommendations G.709 and G.872 define OTN interface requirements and network architecture respectively.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
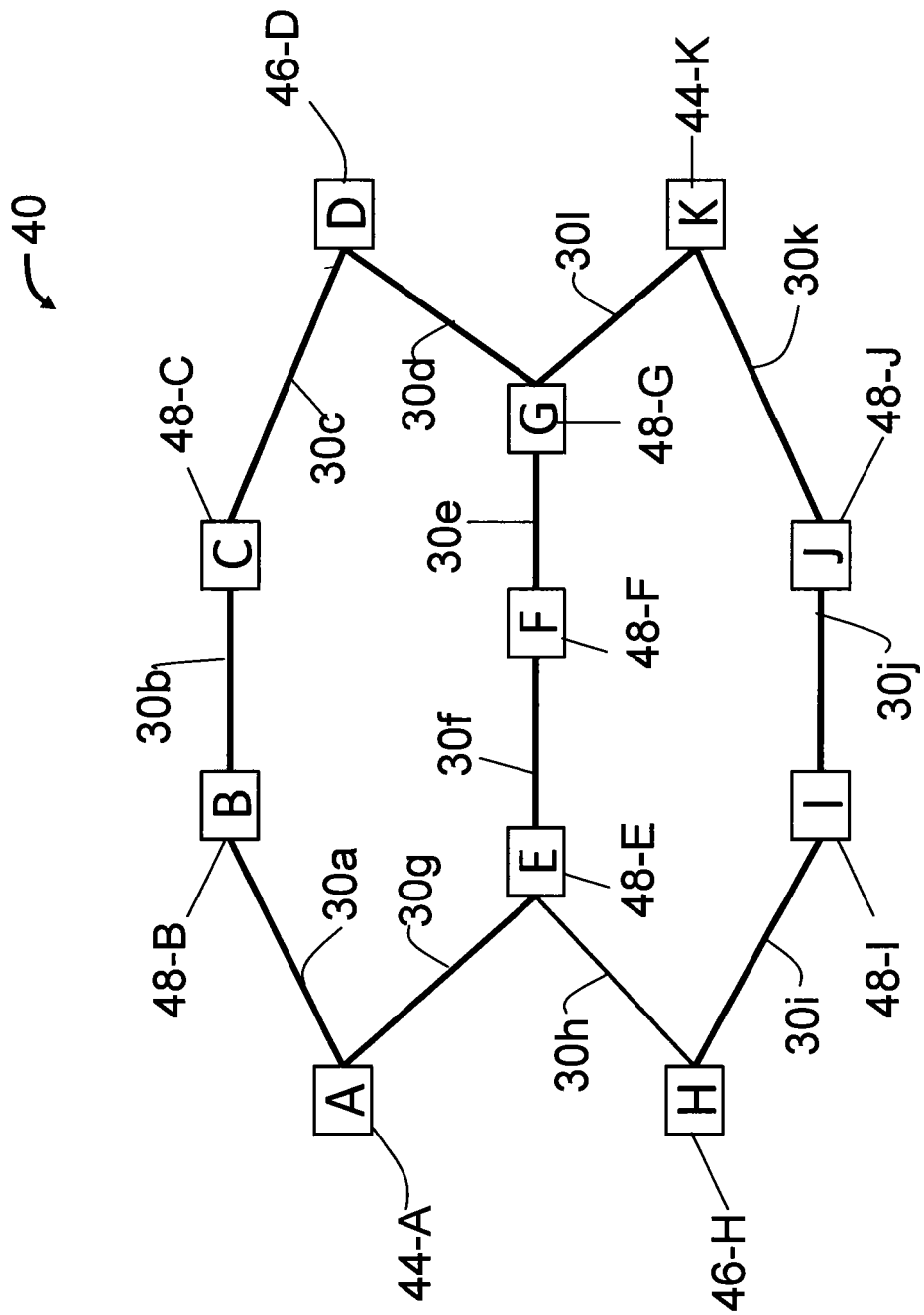
FIG. 2 is a schematic diagram of an exemplary mesh network.

Referring now to the drawings, and in particular to FIG. 1, shown therein and designated by reference numeral 20 is a block diagram of an exemplary node constructed in accordance with the present disclosure. The node 20 is adapted to facilitate the communication of data (which may be referred to herein as "traffic") between multiple nodes 20 in a mesh network 40, as shown in FIG. 2. The mesh network 40 may be, for example, an optical transport network (OTN).

The node 20 is provided with one or more input interfaces 22, one or more output interfaces 24, a control module 26, and a switch 28. In general, the input interfaces, shown here as 22a and 22b, are adapted to receive traffic from the mesh network 40, and the output interfaces, shown here as 24a and 24b, are adapted to transmit traffic onto the mesh network 40 (see FIG. 2). The switch 28 serves to communicate the traffic from the input interfaces 22a and 22b, to the output interfaces 24a and 24b. And, the control module 26 serves to control the operations of the input interfaces 22a and 22b, the output interfaces 24a and 24b, and the switch 28, as well as to set up label switched paths within the mesh network 40. The node 20 may also include non-transitory memory (not shown), either within the control module 26 and/or the switch 28, or separate from the control module 26 and/or the switch 28.

The node 20 can be implemented in a variety of ways, including, commercial installations having one or more backplanes (not shown), racks, and the like. In this example, the input interface(s) 22, the output interface(s) 24, the control module 26 and the switch 28 are typically implemented as separate devices, which may have their own power supply, local memory and processing equipment. In another example, the node 20 can be implemented as a single device having a shared power supply, memory and processing equipment. Or, in another example, the node 20 can be implemented in a modular manner in which one or more of the input interface(s) 22, the output interface(s) 24, the control module 26 and the switch 28 share a power supply and/or housing.

The input interface(s) 22 and the output interface(s) 24 of one node 20 are adapted to communicate with corresponding input interface(s) 22, and output interface(s) 24 of another node 20 within the mesh network 40 via communication links 30, as shown in FIG. 2. An example of an input interface 22 and/or an output interface 24 is an Ethernet card or optical port. In general, each of the input interface(s) 22 and/or the output interface(s) 24 may have a unique logical identification, such as an IP address. The communication links 30 can be implemented in a variety of ways, such as a physical link including electrical (e.g., copper wire or coax) and/or optical signal (e.g., optical fiber or other waveguide) carrying capabilities, or as a wireless link. The communication links 30 can be fiber optic cables, electronics cables, wireless communication links, or the like.

The implementation of the input interface(s) 22, and the output interface(s) 24 will depend upon the particular type of communication link 30 that the particular input interface 22 and/or output interface 24 is designed to communicate with. For example, one of the input interfaces 22 can be designed to communicate wirelessly with another node 20 within the mesh network 40, while one of the output interfaces 24 of the node 20 can be designed to communicate optically through a fiber-optic link. For a particular node 20, the input interfaces 22a and 22b can be of the same type or different types; the output interfaces 24a and 24b can be of the same type or different types; and the input interface(s) 22 and output interface(s) 24 can be of the same type or different types.

The input interface 22 and the output interface 24 are shown separately for purposes of clarity. However, it should be understood that one or more of the input interfaces 22 and/or the output interfaces 24 could be connected to a single communication link 30 and implemented as a single device, such as a line module. Exemplary line modules are described in U.S. Pat. No. 8,223,803 (Application Publication number 20090245289), the entire contents of which are hereby incorporated herein by reference.

A schematic diagram of an exemplary mesh network 40 is shown in FIG. 2, by way of example. In FIG. 2, the mesh network 40 includes nodes 20 labeled as A, B, C, D, E, F, G, H, I, J and K. Some of the nodes 20 are denoted as a headend node 44 (also known as a source node) or tailend node 46 (also known as a destination node) for a particular path in accordance to the path setup direction. Other nodes 20 are known as intermediate nodes 48. In this example, the mesh network 40 includes headend nodes 44-A and 44-K; tailend nodes 46-D and 46-H; and intermediate nodes 48-B, 48-C, 48-E, 48-F, 48-G, 48-I, and 48-J, connected by links 30a-30l.

Figure 3:
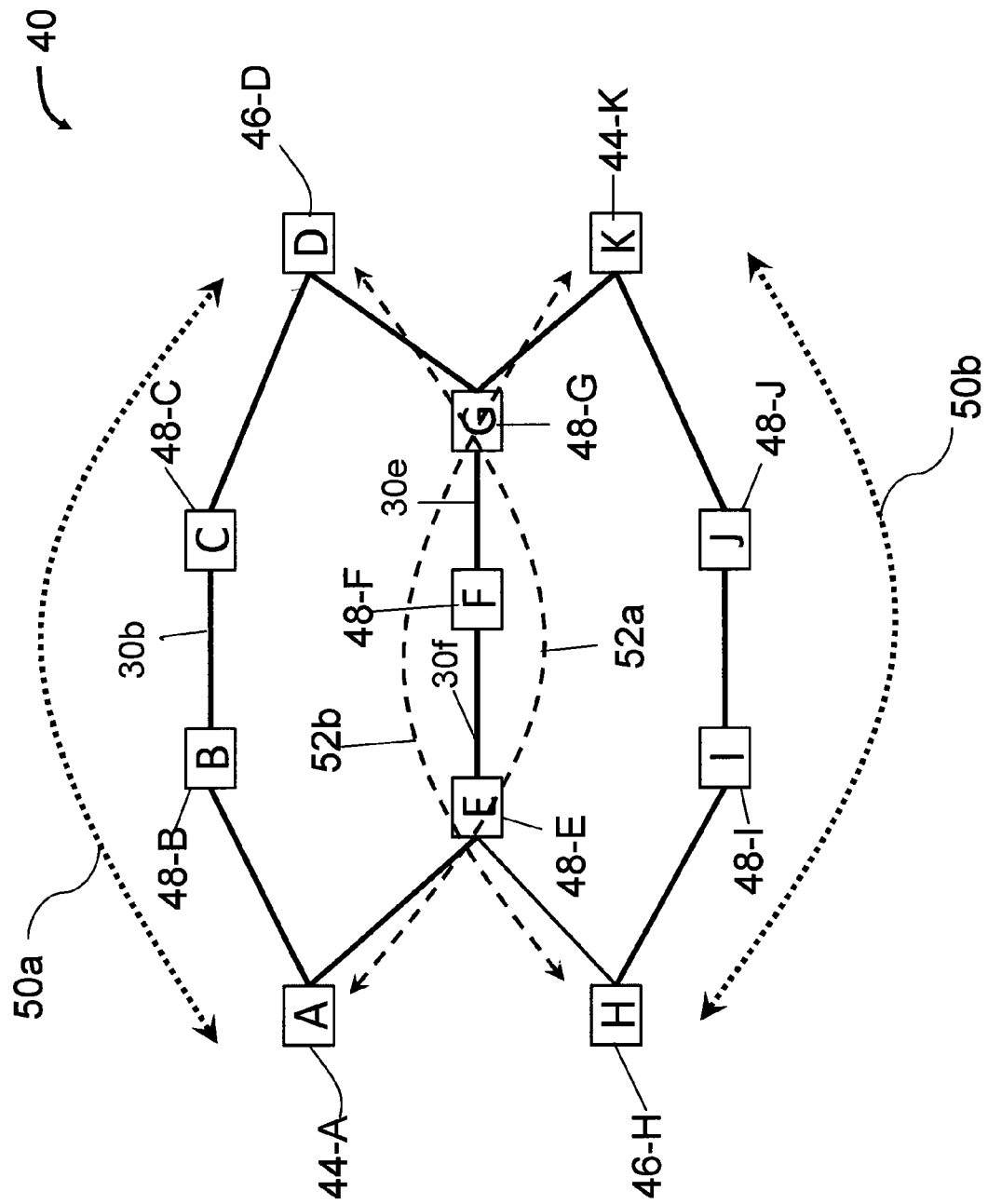
FIG. 3 is a schematic diagram of the mesh network of FIG. 2 showing working and protection connections within the mesh network.

In general, Shared Mesh Protection (SMP), as used herein, refers to a situation in which the headend node 44 or tailend node 46 sets up one or multiple protection paths 52 for a particular working path 50, as illustrated in FIG. 3. Each protection path 52 may reserve the timeslots on the intermediate nodes 48 of the protection path 52, but does not actually configure them until needed. The timeslots may be shared by multiple protection paths 52. Nodes 20 may have network topology information. Topology information may be determined by using standard topology discovery procedures.

The headend node 44 or the tailend node 46 is responsible for detecting the failure of the working path 50. Once the headend node 44 or the tailend node 46 detects a defect in the working path 50, the headend node 44 or the tailend node 46 initiates recovery action by activating the corresponding protection path 52 with activation messages and redirecting user traffic onto the protection path 52. In general, each protection path 52 is likely established over a set of nodes 20 that are shared by multiple other working paths 50 and/or protection paths 52. The node 20 that initiates recovery action by activating the corresponding protection path 52 with activation messages may be referred to as the source node. The mechanisms used to detect the failure of the working path 50 are known to those in the art.

FIG. 3 illustrates the exemplary mesh network 40 depicted in FIG. 2 including two working paths 50a and 50b and two protection paths 52a and 52b. Note that, for purposes of clarity, not all communication links 30 are labeled. Thus, the working paths 50a and 50b are formed by the communication links 30a-30c and nodes {44-A, 48-B, 48-C, 46-D}, and communication links 30k-30i and nodes {44-K, 48-J, 48-I, 46-H} respectively. The protection paths 52a and 52b are formed by the communication links 30g, 30f, 30e, 30d, and nodes {44-A, 48-E, 48-F, 48-G, 46-D}, and communication links 30l, 30e, 30f, 30h, and nodes {44-K, 48-G, 48-F, 48-E, 46-H} respectively. Paths can be established via control planes prior to a failure of the mesh network 40.

In this example, the intermediate nodes 48-E, 48-F, and 48-G, and the communication links 30e and 30f between intermediate nodes 48-E, 48-F, and 48-G, are shared by both protection paths 52a and 52b. The working paths 50a and 50b and the protection paths 52a and 52b can be established by the nodes 20 A-K prior to any network failure, for example, by using GMPLS protocols. The working paths 50 and the protection paths 52 may be bi-directional or co-routed.

In general, in Shared Mesh Protection, both working paths 50a and 50b and protection paths 52a and 52b are setup initially. During setup, network resources, for example, nodes 20 A-K, communication links 30a-30l, and timeslots (not shown), are specified for each path. The working paths 50a and 50b are activated with the appropriate resources on the intermediate nodes 48-B, 48-C, 48I, and 48-J; however, the protection paths 52a and 52b may be reserved/informed but the resources on the intermediate nodes 48-E, 48-F, and 48G, will not be initially activated. Depending on network planning requirements, such as Shared Risk Link Group (SRLG), protection paths 52 may share the same set of resources on intermediate nodes 48-E, 48-F, and 48-G. The resource assignment may be a part of the control-plane Connection Admission Control (CAC) operation taking place on each node.

Upon detection of working path 50a failure (for example, if the communication link 30b between intermediate nodes 48-B and 48-C is cut), the edge node (headend node 44-A and/or tailend node 46-D) will transmit a signal with activation messages to activate the protection path 52a. By processing the activation messages, the intermediate nodes (48-E, 48-F, and 48-G) will program the switch fabric and configure the appropriate resources. Upon the completion of the activation, the edge node (for example, headend node 44-A) will switch the user traffic to the protection path 52a.

In general, logical tables in one or more databases (not shown) may be used to support protection path 52 activation logic. Preferably, the tables include one or more connection tables, one or more logical timeslot tables, and one or more real timeslot tables. The connection table(s) maintains the connection-related information, including label, interfaces, and associated timeslot information for the connections. The logical timeslot table(s) is a timeslot translation table(s) between connections and timeslots. The real timeslot table(s) maintains the timeslot-related information, including the active connections that are currently conveying traffic and reserved connections for all timeslots. A reserved connection means there is not any active traffic on the timeslot. In the situation where the protection path 52 is identified in the connection table, the protection path's 52 associated timeslots can be readily discovered utilizing the logic timeslot table and the real timeslot table.

Shared mesh protection (SMP) may be achieved with multiple methods, such as (1) disjoint end-to-end protection; (2) around the failure protection; and/or (3) disjoint protection over multiple segments (also known as segment shared mesh protection).

Figure 4:
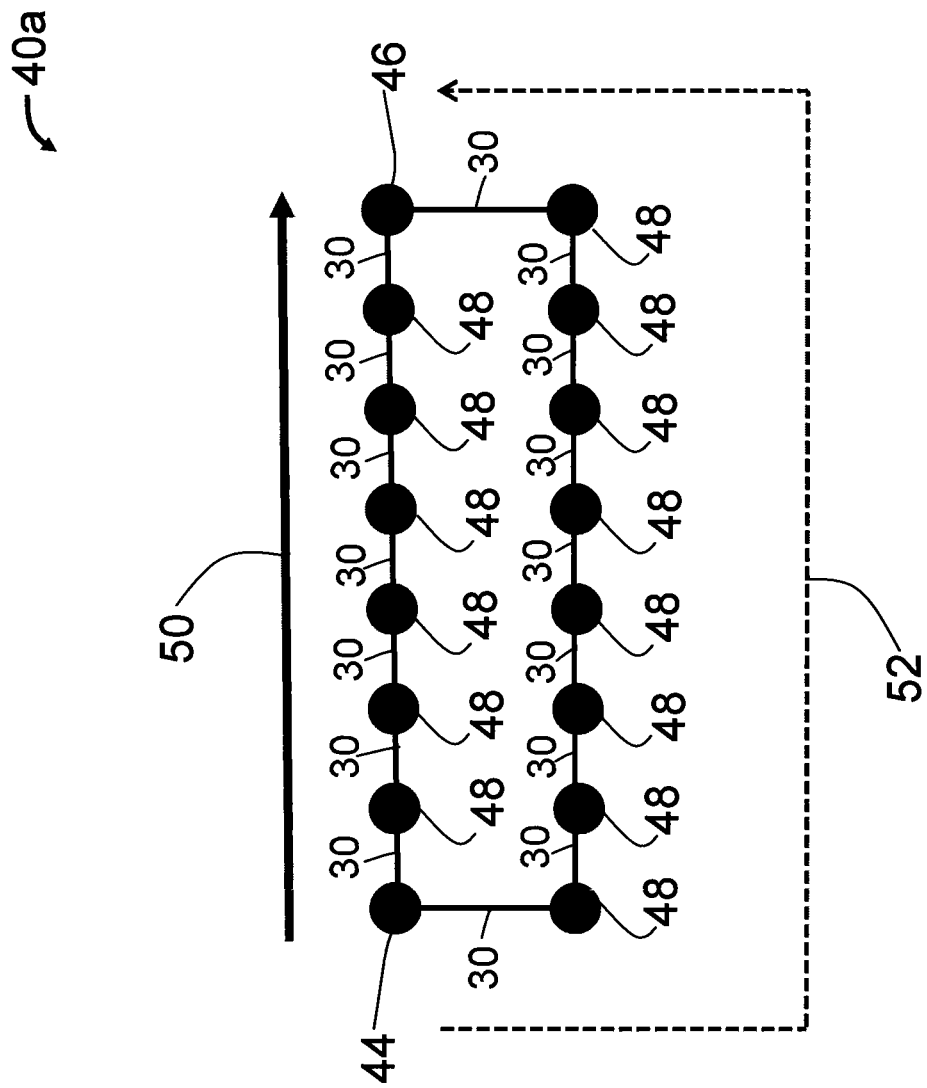
FIG. 4 is a schematic diagram of another example of a mesh network depicting disjoint end-to-end protection with working and protection connections.

FIG. 4 is a schematic diagram of an exemplary mesh network 40a depicting disjoint end-to-end protection. In disjoint protection, protection path 52 uses different communication links 30 and intermediate nodes 48 than the working path 50, or than a segment 60 (also known as a sub-path) of working path 50. In disjoint end-to-end protection, working path 50 and protection path 52 use different communication links 30 and intermediate nodes 48, and the protection path 52 extends between the headend node 44 and the tailend node 46. With disjoint end-to-end protection, the location of the failure in the working path 50 may be unknown. When a headend node 44 or tailend node 46 detects a failure somewhere in the working path 50, the entire working path 50 is changed to the protection path 52. Therefore, knowledge of the exact location of the failure in the working path 50 is not needed. In disjoint end-to-end protection, the protection path 52 can be the same, no matter where the failure occurs in working path 50. However, a large number of additional resources are required to create the protection path 52 in disjoint end-to-end protection because there is no overlap in the working path 50 and the protection path 52.

FIG. 3 also depicts disjoint end-to-end protection with protection paths 52a and 52b. As shown in the example of FIG. 3, resources for disjoint end-to-end protection paths 52a and 52b may be shared. For example, in FIG. 3, protection paths 52a and 52b both utilize intermediate nodes 48-E, 48-F, and 48-G and communication links 30e and 30f.

Figure 5A:
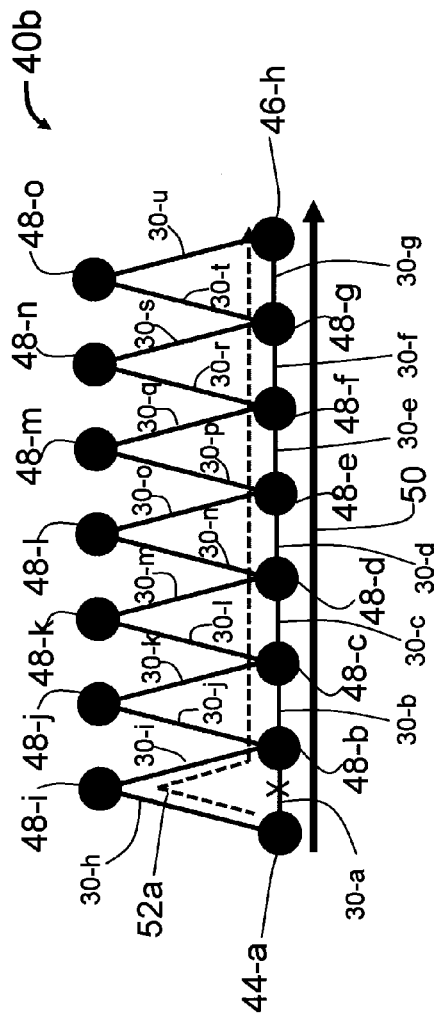
FIG. 5a is a schematic diagram of another example of a mesh network depicting around the failure protection with a working connection and a protection connection.

FIG. 5a is a schematic diagram of an exemplary mesh network 40b illustrating around the failure protection. Around the failure protection uses a shortest path around the failure as the protection path 52a for each failure. Therefore, the protection path 52a protection route is dependent on the location of the failure. Possible locations of failures are illustrated on FIG. 5a-5b with "X"s. Around the failure protection re-uses the parts of the working path 50 that are not associated with the failure. For example, the working path 50 in FIG. 5a includes headend node 44-a, intermediate nodes 48-b through 48-g, tailend node 46-h, and communication links 30-a through 30-g. When a failure X occurs, for example, in communication link 30-a between nodes 44-a and 48-b, then protection path 52a may be activated. Protection path 52a includes headend node 44-a, intermediate nodes 48-i, and 48-b through 48-g, tailend node 46-h, and communication links 30-h, 30-i, and 30-b through 30-g.

Figure 5B:
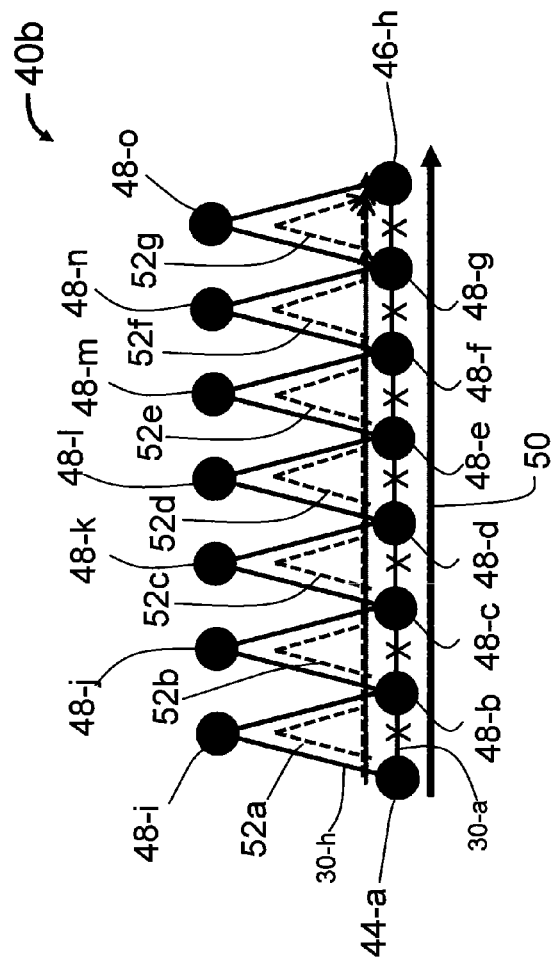
FIG. 5b is a schematic diagram of the mesh network of FIG. 5a depicting around the failure protection with a working connection and multiple protection connections.

However, in around the failure protection, protection paths 52 are needed for each possible failure in the working path 50. An example of around the failure protection having protection paths 52a-52g is shown in FIG. 5b. For purposes of clarity, not all communication links 30 are labeled in FIG. 5b. Again, a large number of resources are required for the protection paths 52a-52g in around the failure protection.

Figure 6A:
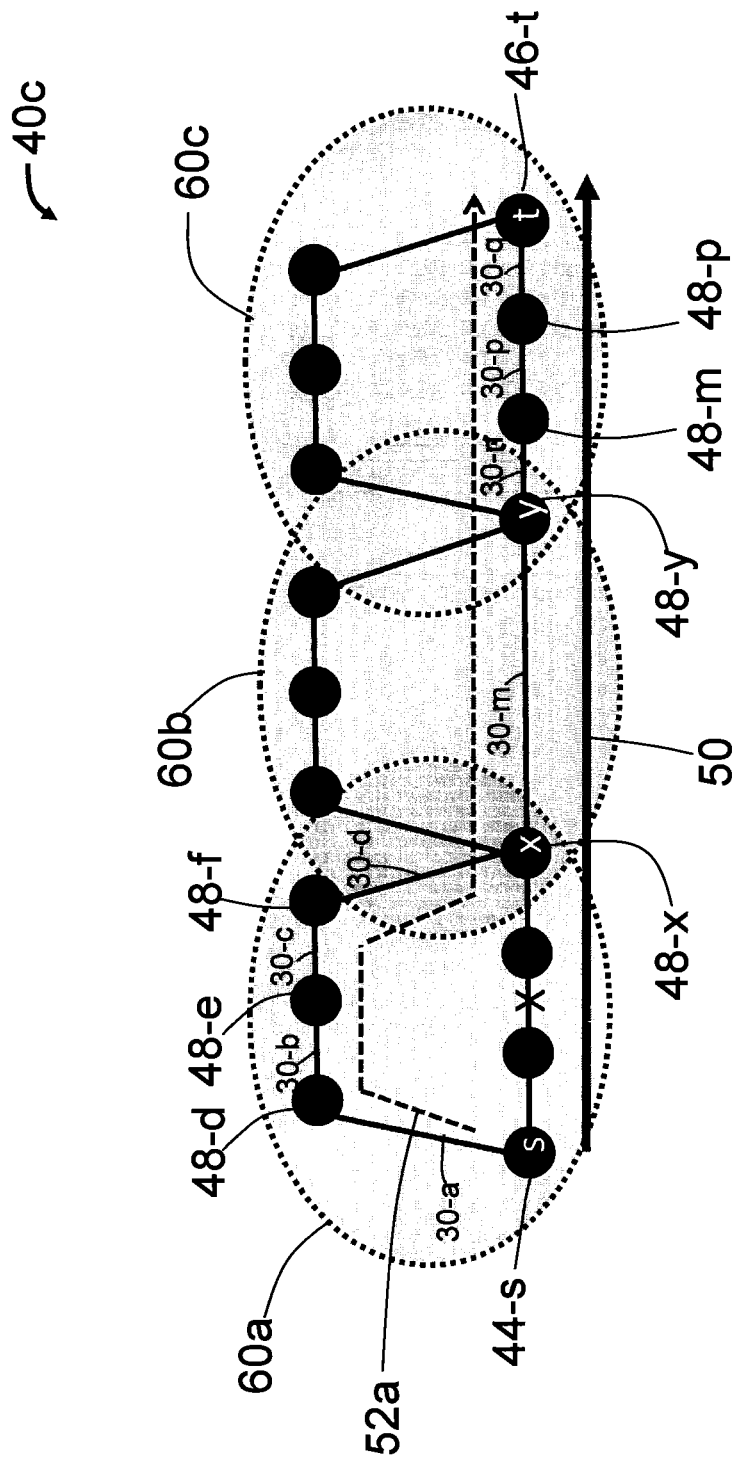
FIG. 6a is a schematic diagram of another example of a mesh network depicting disjoint protection over multiple segments shared mesh protection, also known as segment shared mesh protection, with a working connection and a protection connection.

FIG. 6a is a schematic diagram of an exemplary mesh network 40c illustrating disjoint protection over multiple segments, also known as segment shared mesh protection. Typically, in segment shared mesh protection, for each end-to-end connection (working path 50), segments 60 where disjoint protection is possible are identified. Segments 60 are sub-paths of (portions of) the end-to-end connection of the working path 50. FIG. 6a shows three segments 60a, 60b, and 60c, where disjoint protection is possible. It should be understood that more or fewer segments could be chosen, but three are shown for purposes of clarity.

Disjoint protection of the segment 60a, in which the protection path 52a replaces the segment 60a of the working path 50, can be used in the case of a failure in the segment 60a. The mesh network 40c can re-use the working path 50 on segments 60b and 60c that are not affected by the failure. For example, as shown in FIG. 6a, a failure X is shown between headend node 44-s and intermediate node 48-x in segment 60a (it is not necessary to know the exact failure location within the segment 60a). Disjoint protection of segment 60a is provided by protection path 52a, through intermediate nodes 48-d, 48-e, and 48-f, and links 30-a through 30-d. The protection path 52a can re-use the segments 60b and 60c of the working path 50 where no failure has occurred (that is, through intermediate nodes 48-x, 48-y, 48-m, 48-p, and links 30-m, 30-n, 30-p, and 30q, to tailend node 46-t).

Figure 6B:
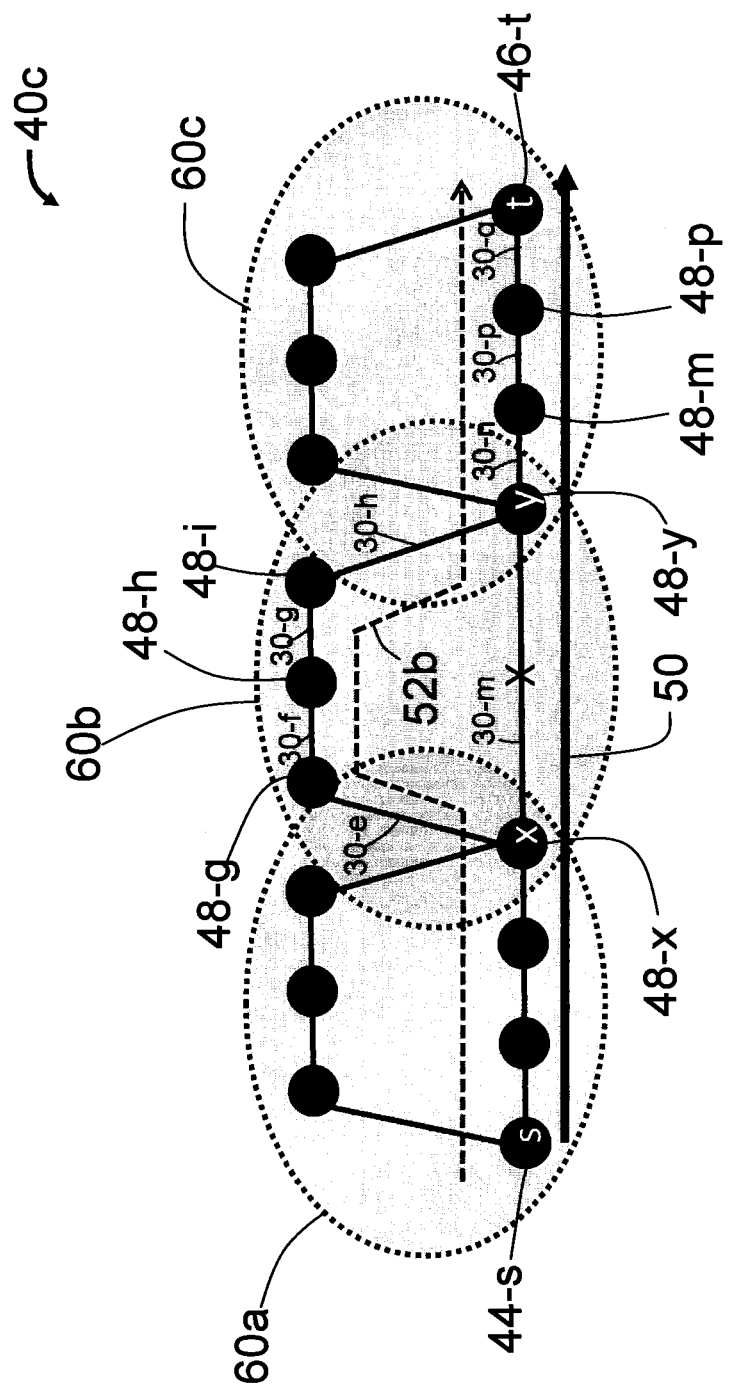
FIG. 6b is a schematic diagram of the mesh network of FIG. 6a depicting segment shared mesh protection, with a working connection and another protection connection.

FIG. 6b is a schematic diagram of the exemplary mesh network 40c shown in FIG. 6a. In FIG. 6b, a failure X has occurred in segment 60b (again, knowledge of the exact failure location within the segment 60b is not necessary). Protection path 52b through nodes 48-g, 48-h, and 48-I, and communication links 30e through 30h, can be used to restore the connection, while reusing the working path 50 through segments 60a and 60c.

Figure 6C:
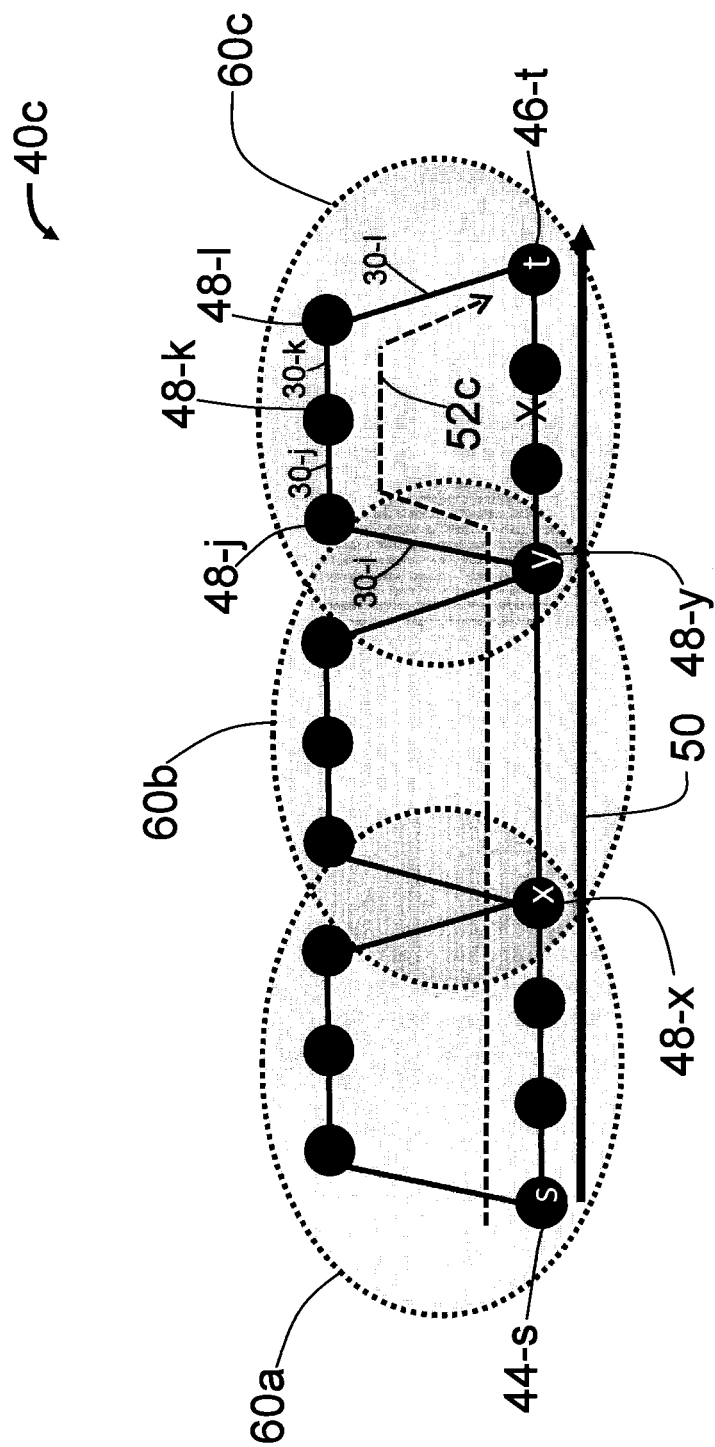
FIG. 6c is a schematic diagram of the mesh network of FIG. 6a depicting segment shared mesh protection, with a working connection and another protection connection.

Similarly, FIG. 6c is a schematic diagram of the exemplary mesh network 40c shown in FIG. 6a, in which a failure X has occurred in segment 60c (again, knowledge of the exact failure location within the segment 60b is not necessary). Protection path 52c through nodes 48-j, 48-k, and 48-l, and links 30-i through 30-l can be used to restore the connection, while reusing the working path 50 through segments 60a and 60b.

Of course, it should be understood that the protection paths 52 may be any length or configuration, and that three intermediate nodes 48 are used in the previous examples for purposes of clarity.

Segment shared mesh protection has several benefits over disjoint end-to-end protection and around the failure protection. Knowledge of the failure location is needed, but not as precisely as is needed in around the failure protection. Knowledge of the segment 60a, 60b, and/or 60c where the failure occurred is sufficient for segment shared mesh protection, whereas in around the failure protection, exact knowledge of the failure location is needed. Also, typically fewer resources may be needed since parts of the working path 50 can be used, unlike disjoint end-to-end protection.

In one embodiment, a method for segment shared mesh protection comprises determining preferred segments 60 and protection paths 52 for segment shared mesh protection of a working path 50 based on the network condition and topology, and for implementing such protection, in order to optimize (that is, use the fewest possible resources while meeting any imposed constraints) the number of resources used for protection in the mesh network 40 while balancing the amount of precision needed for knowledge of the location of failures.

In one embodiment, the working path 50 for the connection in the mesh network 40 may be identified; the potential protection segments 60 for working path 50 which have available disjoint protection path(s) 52 for the segments 60 may be identified; and segments 60 and protection path(s) 52, for the working path 50, that are optimized for resource and failure-knowledge conservation, may be determined, based in part on protection path 52 information such as known link weight, for example, hop count. Additionally, the headend node 44 of the working path 50 may generate and transmit signals with messages to one or more nodes 20 in the protection path(s) 52 to communicate a need for and/or reserve resources for the protection path(s) 52 identified, and/or communicating the network topology based on the determined optimal segments.

Figure 7A:
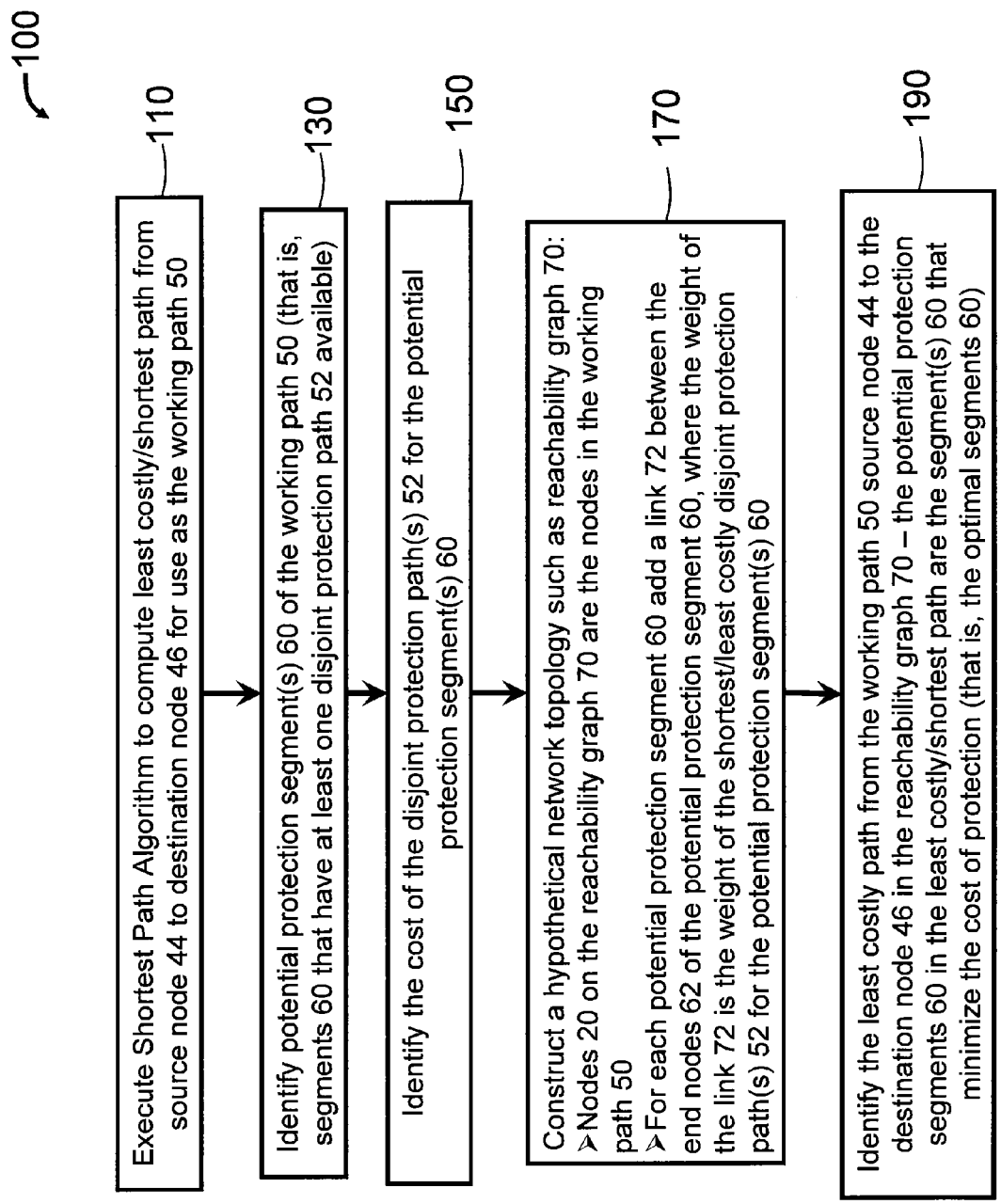
FIG. 7a is a flow diagram of a method, in accordance with the present disclosure, for determining which segments of a working path are desirable for use for shared mesh protection.

FIG. 7a is a flow diagram of a method 100, in accordance with the present disclosure, for determining which segments 60 of a working path 50 are desirable for use for segment shared mesh protection in order to optimize the use of resources, such as communication links 30, in the mesh network 40. The method may be carried out by the circuitry of headend node 44, or may be partially carried out by headend node 44. The method 100 may be carried out outside the headend node 44 and resulting information may be provided to headend node 44. For example, the method 100 may be carried out by one or more processor 80, such as a processor 80 in a network management station. In step 110, a graph search algorithm, such as a Shortest Path Algorithm, may be executed to compute the shortest path from the headend node 44 (also known as the source node) to the tailend node 46 (also known as the destination node) for the working path 50. Of course, it should be understood that any algorithm that provides a shortest path between two nodes on a topology can be used. It should also be understood that information indicative of topology of the mesh network may be stored on non-transitory memory and retrieved by the source node 44.

It will be understood that the term "shortest path" is not limited to determining paths based only on distance, and is intended to encompass any metric, or combination of metrics, which can be used to specify the "cost" of a communication link 30. A non-exhaustive list of metrics includes distance, number of hops, capacity, speed, usage, availability, monetary cost, packet loss probability, latency of communication links 30 (i.e. delay of the communication link 30), etc.

One example of a graph search algorithm for determination of shortest path (i.e. the Shortest Path Algorithm) is Dijkstra's Algorithm. In general with Dijkstra's Algorithm, for a given source node 44 (vertex) in the graph, the algorithm finds the path with lowest cost between the source node 44 and every other node 20. Dijkstra's Algorithm can also be used for finding costs of shortest paths from a single node 20 to a single destination node 46 by stopping the algorithm once the shortest path to the destination node 46 has been determined. Dijkstra's Algorithm assigns some initial distance values and tries to improve the distance values step by step.

Dijkstra's Algorithm, also known as Dijkstra's Method and as Dijkstra's Shortest Path Algorithm, is well known in the art (see E. W. Dijkstra: *A note on two problems in connection with graphs*, Numerical Mathematics, 1:269-271, 1959). For example, U.S. patent application Ser. No. 10/359,700, which is incorporated herein by reference, describes Dijkstra's Algorithm (see paragraphs [0022]-[0031] and FIGS. 1a, 1b, 1c, 2).

Of course, it should be understood that the topology of the mesh network 40, including the working path 50 connection and/or the shortest paths through the mesh network 40 for connections, may be determined in other ways and/or may be provided to the headend node 44-S.

Figure 8A:
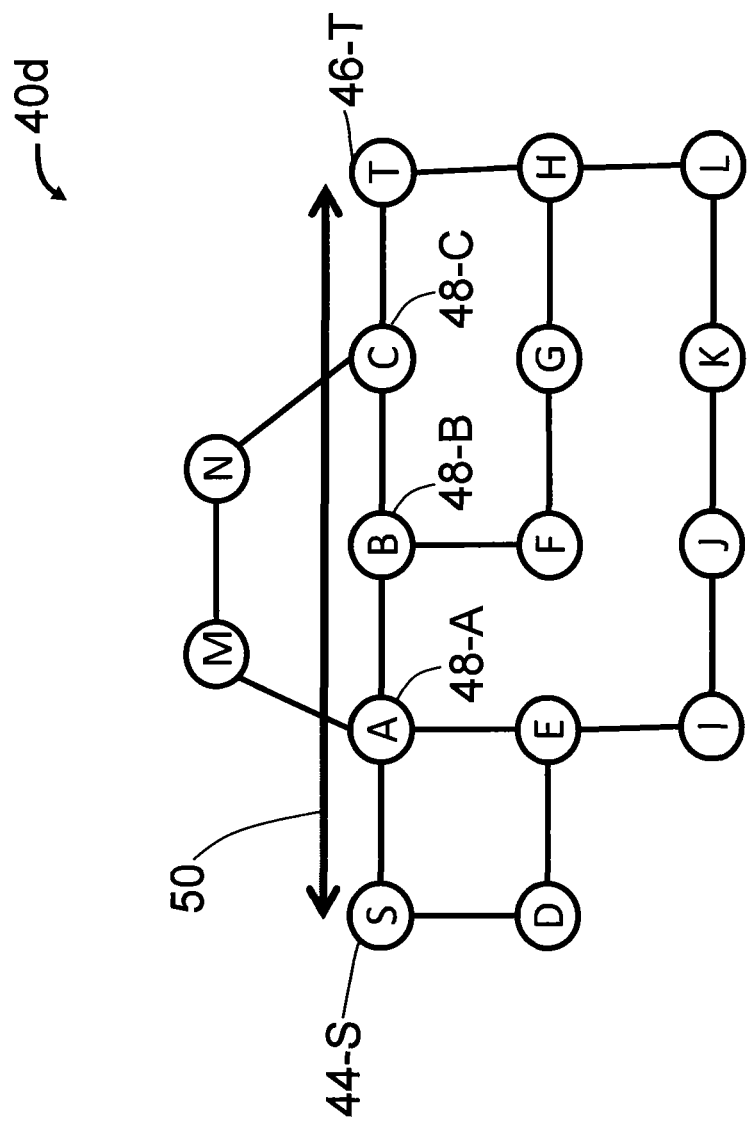
FIG. 8a is a schematic diagram of another exemplary mesh network with a working path.

By way of example, FIG. 8a is a schematic diagram illustrating an exemplary mesh network 40d. Headend node 44-S and other nodes 20 A-N and 46-T in the mesh network 40d may have network topology information and/or may be provided network topology information. Information indicative of topology of the mesh network 40 may be stored on non-transitory memory. Topology information may be determined by using standard topology discovery procedures. The weight, a function of cost, such as hop count, of the communication link 30, may be known. The graph search algorithm may determine the shortest path through the mesh network 40d for the working path 50 and/or for any other connections through the mesh network 40d. The graph search algorithm may be executed with a running time complexity of $O(N \log(N))$ where N is the set of nodes in the mesh network 40.

In FIG. 8a, an exemplary working path 50, determined by the execution of the Shortest Path Algorithm in step 110, is shown. Working path 50 includes headend node 44-S (also referred to as source node), intermediate nodes 48A, 48-B, and 48-C, and tailend node 46-T (also referred to as destination node). The headend node 44-S and tailend node 46-T are also referred to as edge nodes.

Returning now to FIG. 7a, in the next step 130 of method 100, the source node 44-S identifies segments 60 of the working path 50 that have at least one disjoint protection path 52 available in the mesh network 40d for the segment 60. Segments 60 are sub-sections of working path 50. Segments 60 may also be referred to as sub-paths and/or sub-segments. The segments 60 that have at least one disjoint protection path 52 available will be referred to herein as potential protection segments 60. Disjoint protection paths 52 do not use resources, such as communication link(s) 30, of the segments 60 or the working path 50.

If a disjoint protection path 52 is possible for segment 60, then the identification of the potential protection segment 60 and the associated disjoint protection path 52 for that potential protection segment 60 may be recorded in non-transitory memory (not shown). The identification of the potential protection segment 60 and the disjoint protection path 52 for the potential protection segment 60 may be recorded by the circuitry of the headend node 44-S in non-transitory memory, or may be recorded elsewhere and provided to the headend node 44-S. The complexity of the identification of the potential protection segments 60d of the working path 50 may be polynomial and may be represented by $O(N^2 \log(N))$ where N is the set of nodes.

Figure 8B:
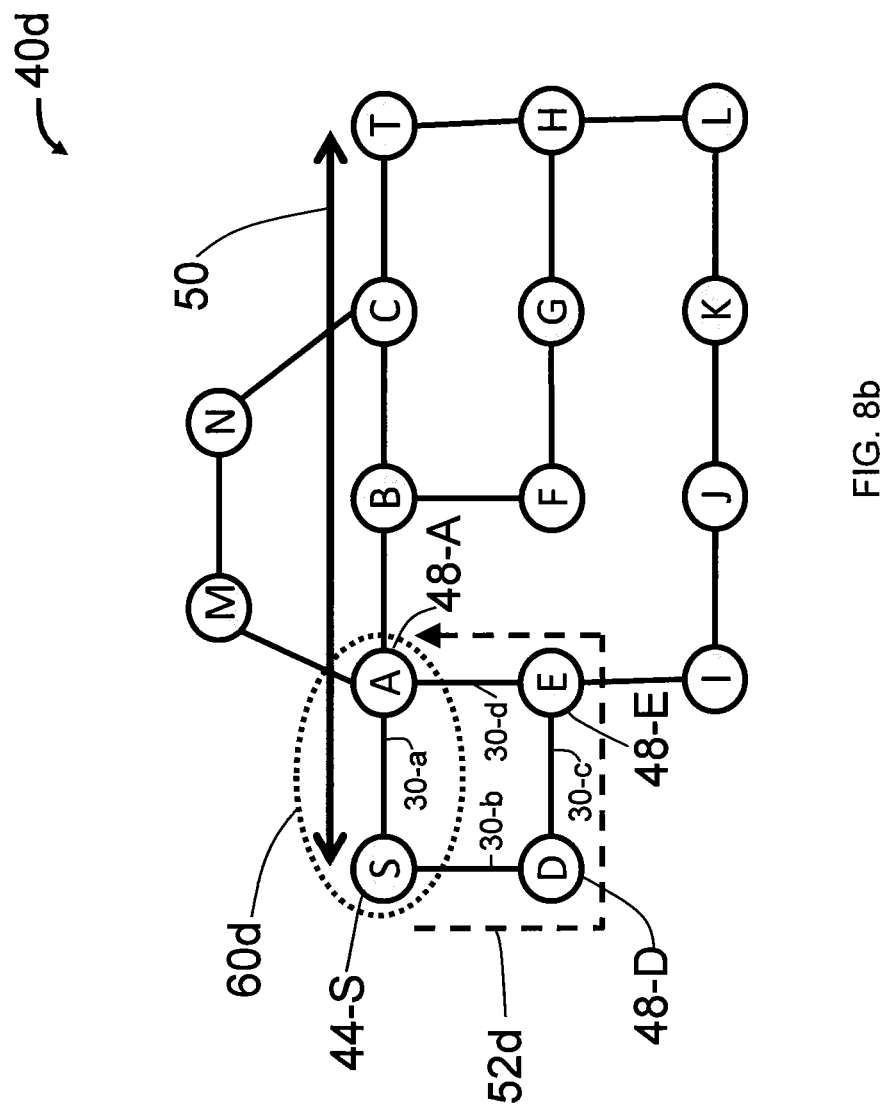
FIG. 8b is a schematic diagram of the exemplary mesh-network (also shown in FIG. 8a) illustrating segment identification.

FIG. 8b is a schematic diagram illustrating exemplary mesh network 40d in which a potential protection segment 60d has been identified with an associated disjoint protection path 52d. Potential protection segment 60d includes source node 44-S, communication link 30-*a*, and intermediate node 48-A. The associated disjoint protection path 52d includes communication link 30-b, node 48-D, communication link 30-c, node 48-E, and communication link 30-d.

Figure 7B:
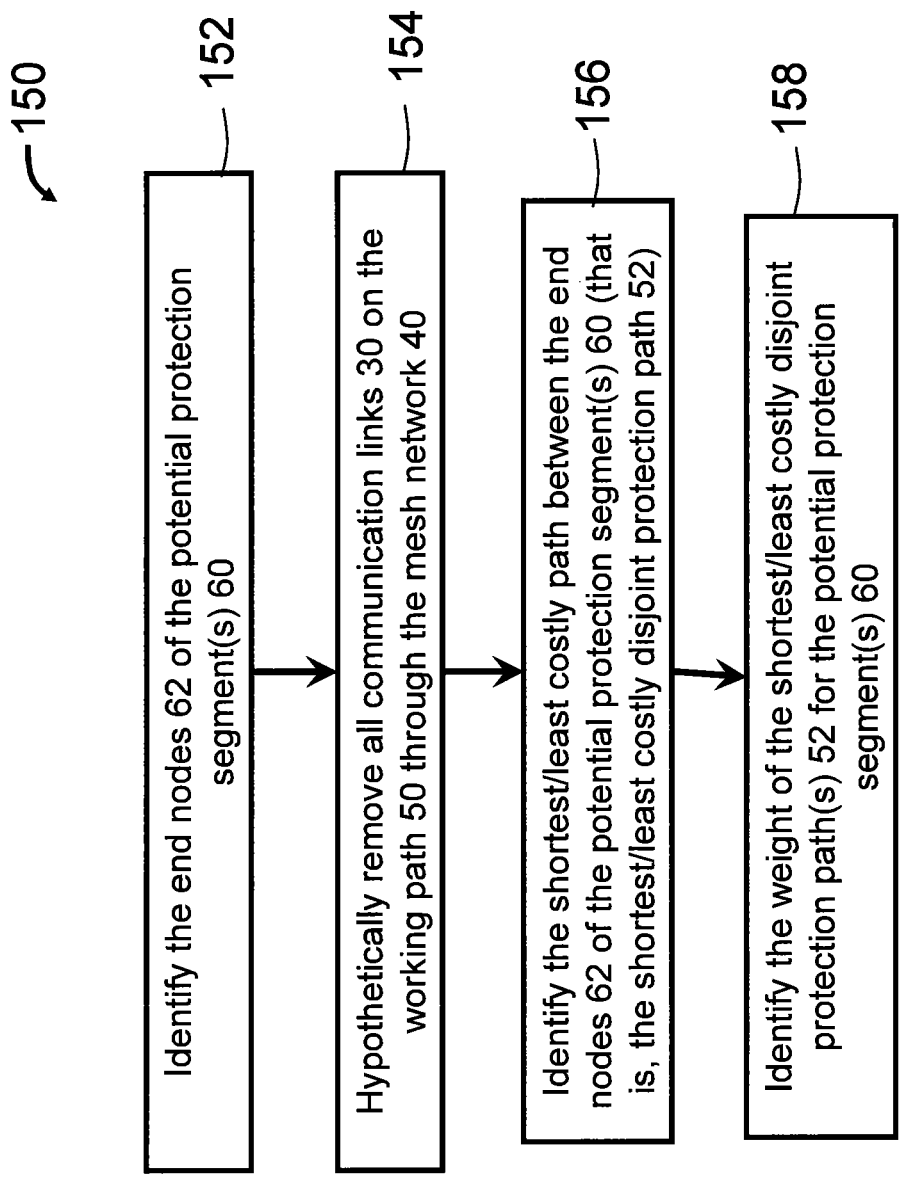

Returning to FIG. 7a, in step 150, the source node 44-S identifies the cost of the disjoint protection path(s) 52 for the potential protection segment(s) 60. FIG. 7b is a flow diagram of the sub-steps of step 150. In sub-step 152 in FIG. 7b, the source node 44-S identifies the end nodes 62 of the potential protection segments 60. End nodes 62 are the first node 20 of the segment 60 and the last node 20 of the segment 60. Next, in step 154, the source node 44-S hypothetically removes the communication links 30 on the working path 50. It should be understood that step 154 may be before or after step 152.

In step 156, the source node 44-S identifies the shortest path between the end nodes 62 of the potential protection segments 60, that is, the shortest disjoint protection path 52. The shortest path may be identified with the Shortest Path Algorithm, such as Dijkstra's Algorithm and/or Bellman Ford's Algorithm. Finally, in step 158, the source node 44-S identifies the weight of the shortest disjoint protection path 52 identified in step 156. The weight may be a function of the cost of the shortest disjoint protection path, for example, the number of "hops" (hop count).

Figure 8C:
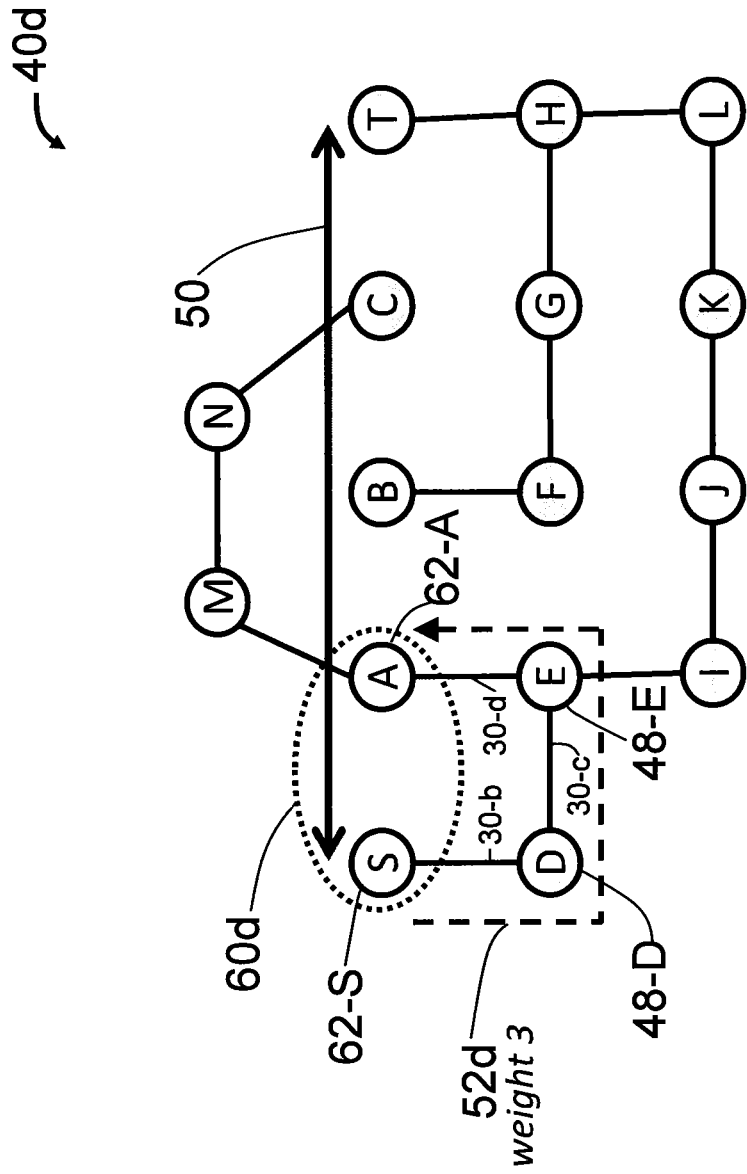
FIG. 8c is a schematic diagram of the exemplary mesh network (also shown in FIG. 8a) illustrating disjoint protection path identification for a segment.

For example, FIG. 8c is a schematic diagram of the exemplary mesh network 40d in which communication links 30 have been hypothetically removed from working path 50. Source node 44-S identifies the end nodes 62-S (which is also node 44-S) and 62-A of potential protection segment 60d (S-A). Source node 44-S then executes the Shortest Path Algorithm and identifies the shortest disjoint protection path 52d for segment 60d. The source node 44-S then identifies the weight of the shortest disjoint protection path 52d. In this example, weight is identified as the number of hops (i.e. hop count) and disjoint protection path 52d has a weight of three (62-S to 48-D, 48-D to 48-E, and 48-E to 62-A).

Figure 8D:
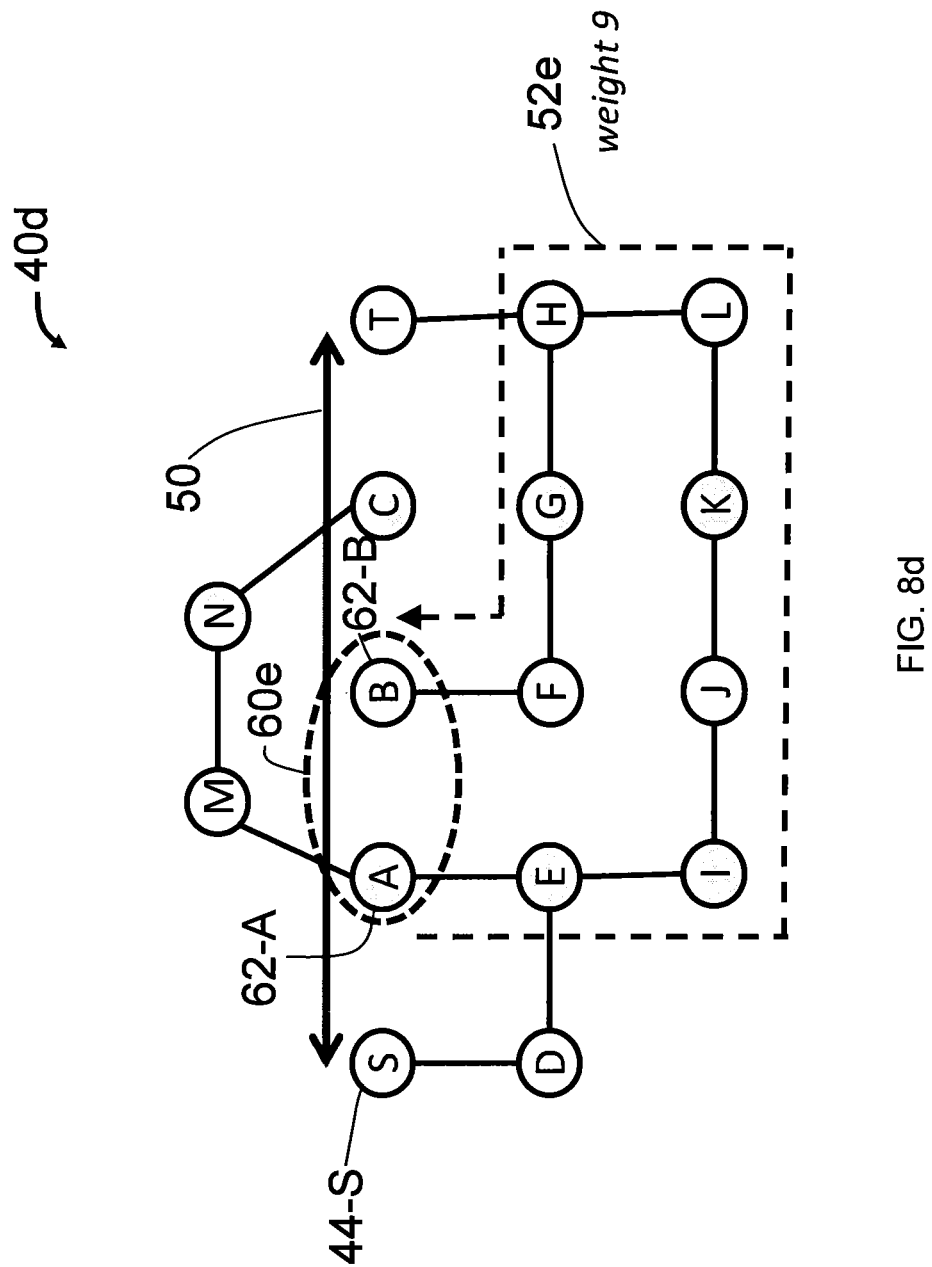
FIG. 8d is a schematic diagram of the exemplary mesh network (also shown in FIG. 8a) illustrating another disjoint protection path identification.

Furthering the example of FIG. 8c, in FIG. 8d, source node 44-S identifies the end nodes 62-A and 62-B of potential protection segment 60e (A-B). Source node 44-S then executes the Shortest Path Algorithm and identifies the shortest disjoint protection path 52e for segment 60e. The source node 44-S then identifies the weight of the shortest disjoint protection path 52e. In this example, weight is identified as the number of hops (i.e. hop count) and disjoint protection path 52e has a weight of nine.

Figure 8E:
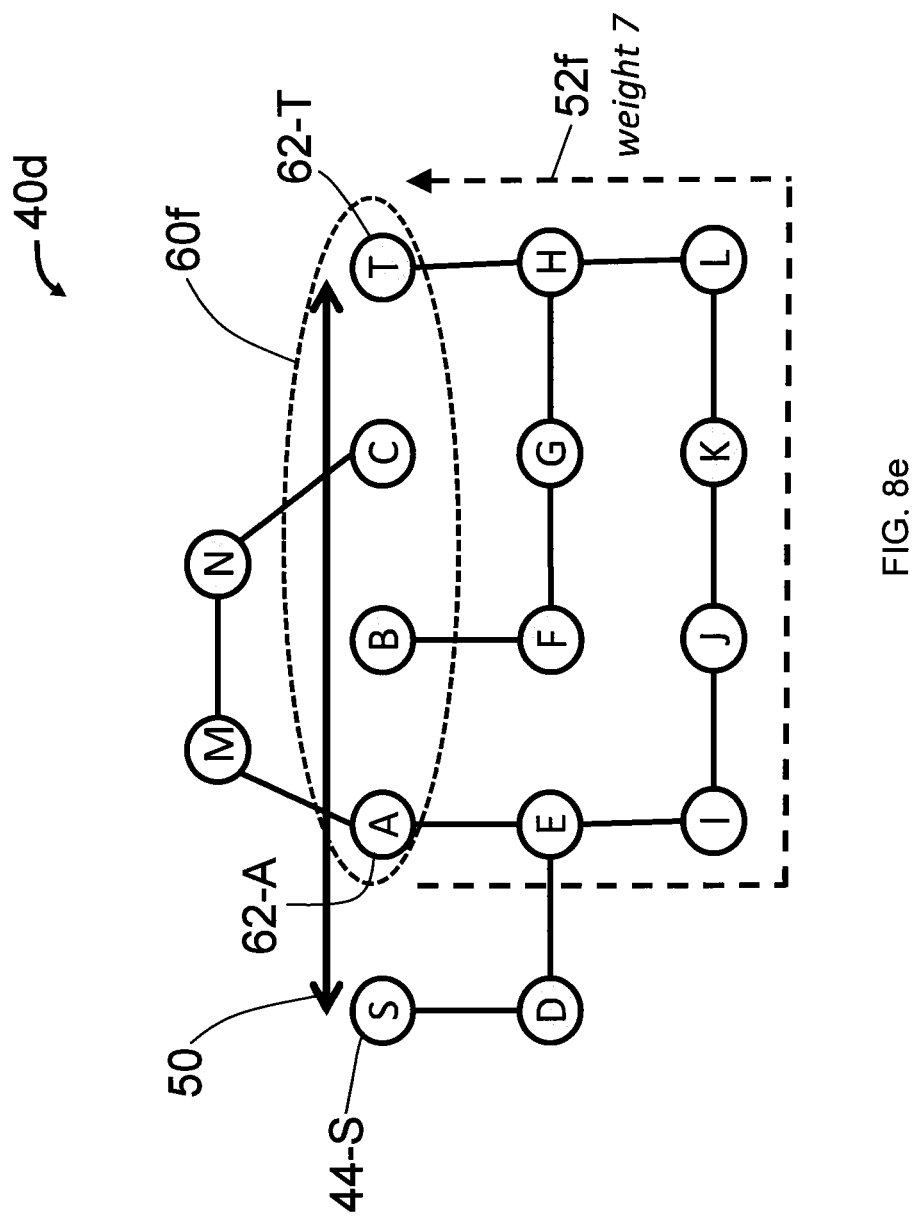
FIG. 8e is a schematic diagram of the exemplary mesh network (also shown in FIG. 8a) illustrating another disjoint protection path identification.

Continuing the example, in FIG. 8e, source node 44-S identifies the end nodes 62-A and 62-T (which is also destination node 46-T) of potential protection segment 60f (A-B-C-T). Source node 44-S then executes the Shortest Path Algorithm and identifies the shortest disjoint protection path 52f for segment 60f. The source node 44-S then identifies the weight of the shortest disjoint protection path 52f. In this example, weight is identified as the number of hops (i.e. hop count) and disjoint protection path 52f has a weight of seven.

Figure 8F:
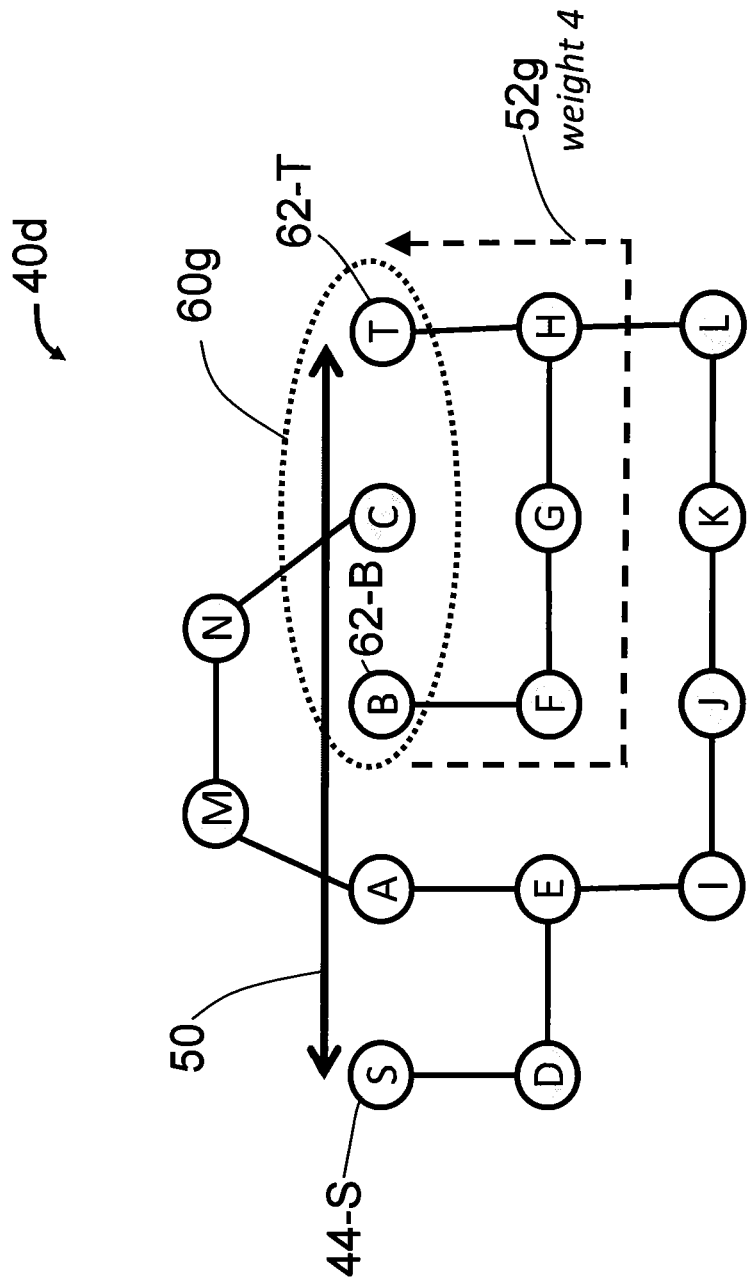
FIG. 8f is a schematic diagram of the exemplary mesh network (also shown in FIG. 8a) illustrating another disjoint protection path identification.

And, in FIG. 8f, source node 44-S identifies the end nodes 62-B and 62-T of potential protection segment 60g (B-C-T). Source node 44-S then executes the Shortest Path Algorithm and identifies the shortest disjoint protection path 52f for segment 60g. The source node 44-S then identifies the weight of the shortest disjoint protection path 52g. In this example, weight is identified as the number of hops (i.e. hop count) and disjoint protection path 52g has a weight of four.

The following Table 1 contains the potential protection segments 60, disjoint protection paths 52 for the potential protection segments 60, and number of hops (i.e. hop count) for the disjoint protection paths 52 for the exemplary mesh network 40d exemplified in FIGS. 8a-8f. For purposes of clarity, communication links 30 are not listed in the disjoint protection paths.

TABLE 1

| Segment (60) | Disjoint Protection Path (52) | Hop Count of Disjoint Protection Path |
|---|---|---|
| S-A (60d) | S-D-E-A (52d) | 3 |
| S-A-B | S-D-E-I-J-K-L-H-G-F-B | 10 |
| S-A-B-C-T | S-D-E-I-J-K-L-H-T | 8 |
| A-B (60e) | A-E-I-J-K-L-J-G-F-B (52e) | 9 |
| A-B-C | A-M-N-C | 3 |
| A-B-C-T (60f) | A-E-I-J-K-L-H-T (52f) | 7 |
| B-C-T (60g) | B-F-G-H-T (52g) | 4 |

Figure 9A:
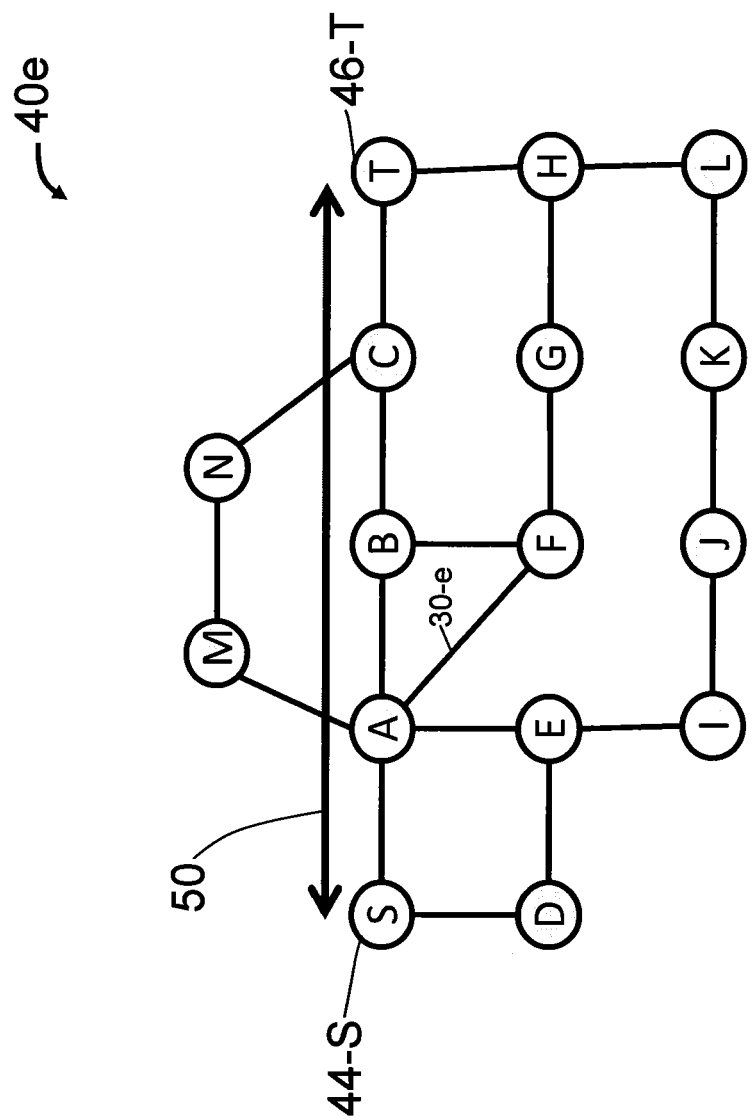
FIG. 9a is a schematic diagram of another exemplary mesh network similar to FIG. 8a but with an additional communication link.
Figure 9B:
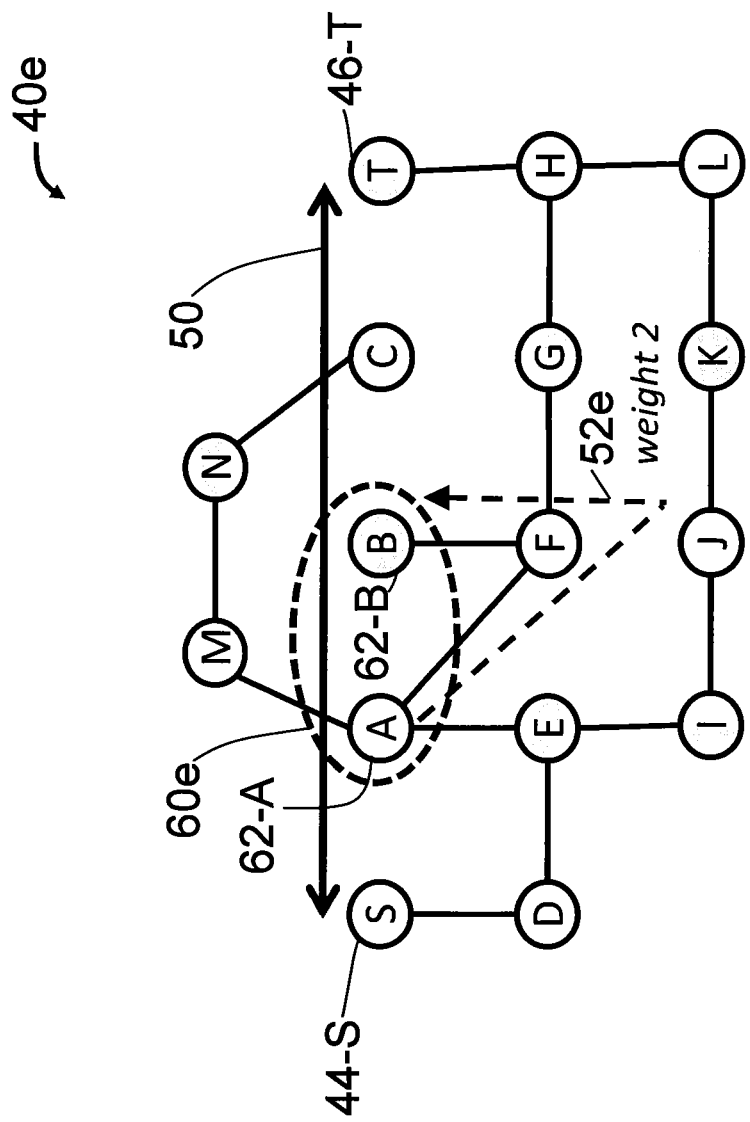
FIG. 9b is a schematic diagram of another exemplary mesh network similar to FIG. 8d but with an additional communication link.

FIG. 9a is a schematic diagram of another example of a mesh network 40e. The mesh network 40e is similar to the mesh network 40d, with the exception of an additional communication link 30e between nodes 48-A and 48-F. FIG. 9b is a schematic diagram of the mesh network 40e of FIG. 9a with the communication links of working path 50 hypothetically removed, illustrating source node 44-S identifying the end nodes 62-A and 62-B of potential protection segment 60e (A-B). Source node 44-S then executes the Shortest Path Algorithm and identifies the shortest disjoint protection path 52e for segment 60e. The source node 44-S then identifies the weight of the shortest disjoint protection path 52e. Note that the addition of the communication link 30e between nodes 48-A and 48-F changes disjoint protection path 52e (nodes 48-A to 48-F to 48-B) for segment 60e (nodes 48-A to 48-B) from the example in FIG. 8d. In FIG. 9b, disjoint protection path 52e has a reduced number of hops (two).

Figure 9C:
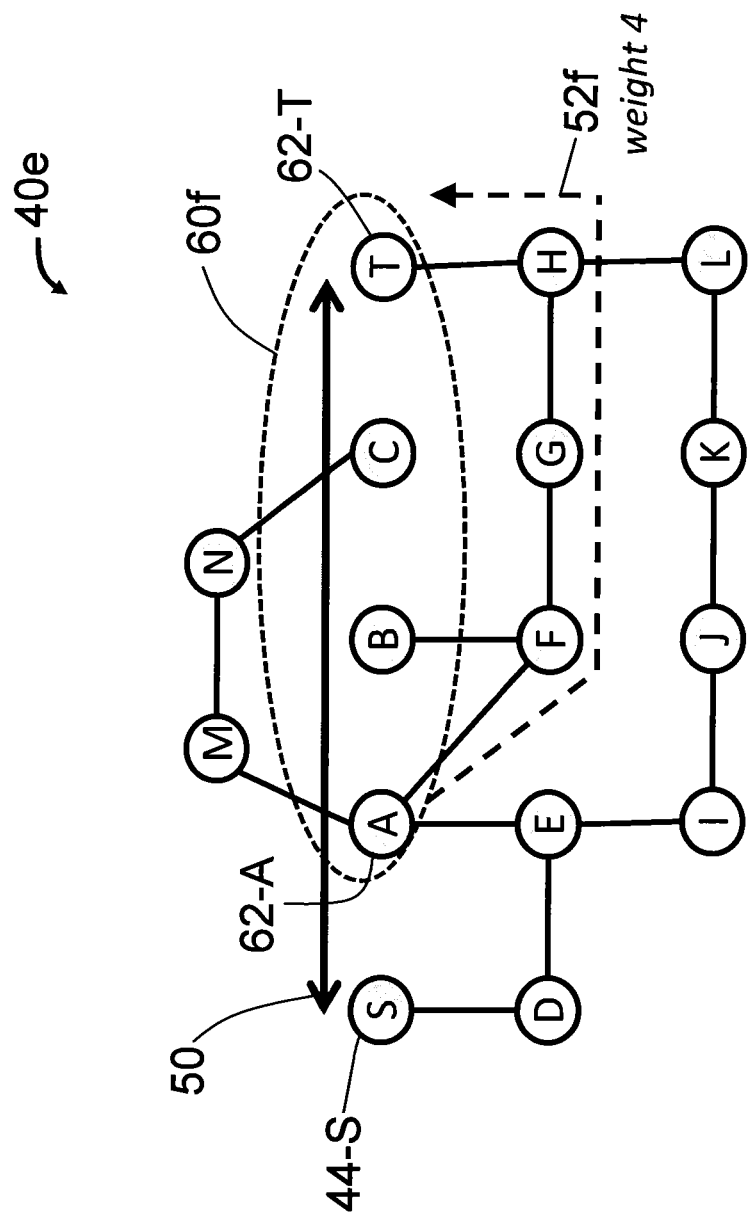
FIG. 9c is a schematic diagram of another exemplary mesh network similar to FIG. 8e but with an additional communication link.

FIG. 9c is a schematic diagram of the mesh network 40e of FIG. 9a with the communication links of working path 50 hypothetically removed, illustrating source node 44-S identifies the end nodes 62-A and 62-T (which is also destination node 46-T) of potential protection segment 60f (A-B-C-T). Source node 44-S then executes the Shortest Path Algorithm and identifies the shortest disjoint protection path 52f for segment 60f. The source node 44-S then identifies the weight of the shortest disjoint protection path 52f. Note that the addition of the communication link 30e between nodes 48-A and 48-F changes disjoint protection path 52f (nodes 48-A to 48-F to 48-G to 48-H to 46-T) for segment 60f (nodes 48-A to 48-B to 48-C to 46-T) from the example in FIG. 8e with a reduced number of hops (four).

The following Table 2 contains of potential protection segments 60, disjoint protection paths 52 for the potential protection segments 60, and number of hops for the disjoint protection paths 52 for the exemplary mesh network 40e shown in FIGS. 9a-9c. For purposes of clarity, communication links 30 are not listed in the disjoint protection paths.

TABLE 2

| Segment (60) | Disjoint Protection Path (52) | Hop Count of Disjoint Protection Path |
|---|---|---|
| S-A (60d) | S-D-E-A (52d) | 3 |
| S-A-B | S-D-E-I-J-K-L-H-G-F-B | 10 |
| S-A-B-C-T | S-D-E-I-J-K-L-H-T | 8 |
| A-B (60e) | A-F-B (52e) | 2 |
| A-B-C | A-M-N-C | 3 |
| A-B-C-T (60f) | A-F-G-H-T (52f) | 4 |
| B-C-T | B-F-G-H-T | 4 |

The source node 44-S may save information indicative of the determined network topology, such as the potential protection segments 60, the associated disjoint protection paths 52, and the disjoint protection path 52 weights, in non-transitory memory.

In general, the headend node 44-S may execute, with circuitry in the headend node 44-S, a Shortest Path Algorithm on the potential protection segments 60 and related disjoint protection paths 52 to calculate the shortest path through protection paths 52 and/or segments 60 for the working path 50 in the event of a failure in the working path 50. Examples of Shortest Path Algorithms are Dijkstra's Algorithm and Bellman Ford's Algorithm.

Figure 10:
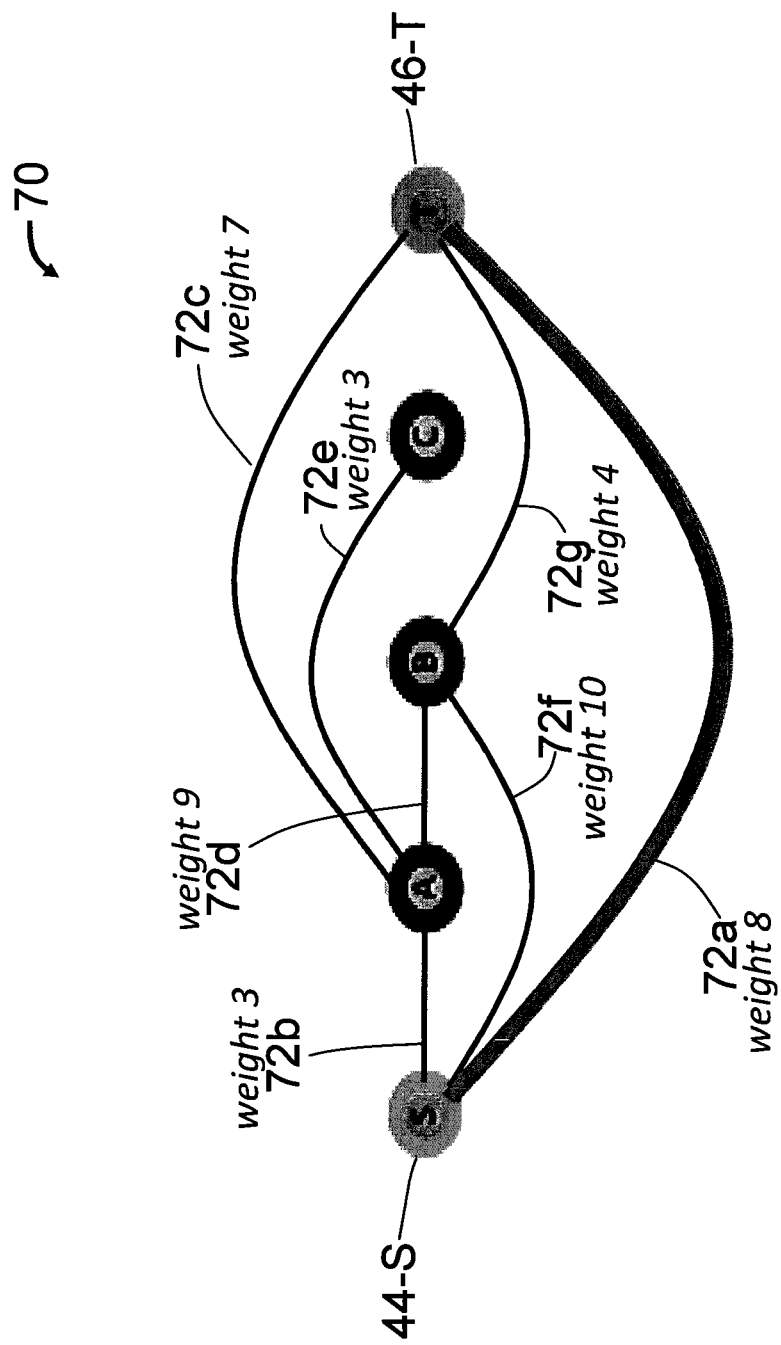
FIG. 10 is a schematic diagram of an exemplary hypothetical network topology for the working connection described in FIG. 8a in the form of a reachability graph in accordance with the present disclosure and reflecting the mesh network of FIGS. 8b-8f.

More specifically, returning now to FIG. 7*a*, in step 170, a hypothetical network topology, which may be in the form of a "reachability graph" 70 (also referred to as a "reduced graph", "residual topology", or RG), may be constructed in conjunction with executing a Shortest Path Algorithm on the recorded segments 60 and recorded disjoint protection paths 52. FIG. 10 is a schematic diagram of an exemplary reachability graph 70 in accordance with the present disclosure. The reachability graph 70 is a hypothetical network topology which includes the nodes 20 from the working path 50 of the mesh network 40*d*, shown in FIGS. 8*a*-8*f*. Additionally, for each potential protection segment 60 of the working path 50 identified previously for mesh network 40*d*, a hypothetical link referred to as reachability link 72 is added to the hypothetical network topology between the end nodes 62 of the potential protection segment 60. Each reachability link 72 may represent one of the identified potential protection segments 60. The reachability link 72 in the reachability graph 70 is assigned an identified weight that is a function of the cost (such as number of hops and/or a function of extra bandwidth required over already allocated bandwidth on the protection path) of the disjoint protection path 52 for the segment 60 represented by the reachability link 72. The complexity of constructing the reachability graph is O(N^2 log(N)). FIG. 10 represents the exemplary mesh network 40*d*, with segments 60 represented as reachability links 72 and weights (here, hop count designated by "weight n") as illustrated in FIGS. 8*a*-8*f* and described above (see Table 1).

Returning again to FIG. 7*a*, in step 190, once the reachability graph 70 topology is determined, the shortest path algorithm (such as Dijkstra's algorithm or Bellman Ford's algorithm) may be run on the hypothetical network topology from the headend node 44-S to the tailend node 46-T of the working path 50. The potential protection segments 60 in the shortest path in the reachability graph 70 found by the Shortest Path Algorithm are then identified as the chosen optimal segments 60 for the segment shared mesh protection of the working path 50. The complexity of determining the optimal segments is polynomial and may be represented by O(N log(N)).

For example, Table 3 depicts the relationship between the exemplary potential protection segments 60, weights, and reachability links 72.

TABLE 3

| Segment (60) | Disjoint Protection Path (52) | Hop Count of Disjoint Protection Path (link weight) | Reachability Link Reference Number (72) |
| --- | --- | --- | --- |
| S-A (60d) | S-D-E-A (52d) | 3 | 72b |
| S-A-B | S-D-E-I-J-K-L-H-G-F-B | 10 | 72f |
| S-A-B-C-T | S-D-E-I-J-K-L-H-T | 8 | 72a |
| A-B (60e) | A-E-I-J-K-L-J-G-F-B (52e) | 9 | 72d |
| A-B-C | A-M-N-C | 3 | 72e |
| A-B-C-T (60f) | A-E-I-J-K-L-H-T (52f) | 7 | 72c |
| B-C-T (60g) | B-F-G-H-T (52g) | 4 | 72g |

Using the shortest path algorithm on the hypothetical network topology, which may be in the form of the reachability graph 70 depicted in FIG. 10, produces the shortest path through the reachability graph 70 for the segment shared mesh protection of the working path 50. In this example, the shortest path is reachability link 72*a*. Therefore the chosen optimal segment(s) 60 in this example is S-A-B-C-T, which happens to be the working path 50.

Figure 11:
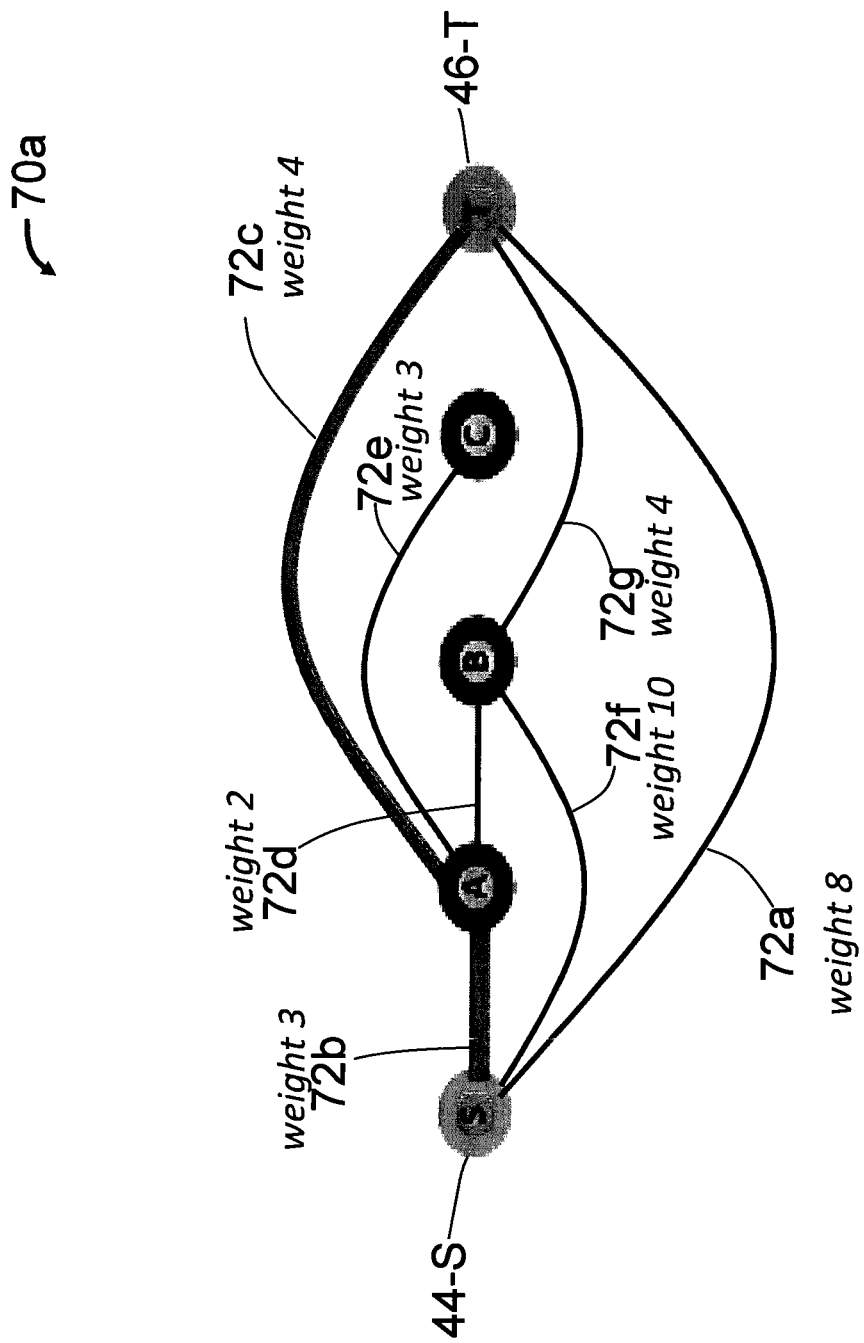
FIG. 11 is a schematic diagram of another exemplary hypothetical network topology for the working connection described in FIG. 9a in the form of a reachability graph in accordance with the present disclosure and reflecting the mesh network of FIG. 9b-9c.

Another example of a reachability graph 70*a* is illustrated in FIG. 11. FIG. 11 represents the exemplary mesh network 40*e*, with reachability links 72 representing segments 60 and weights (here, hop count) as illustrated in FIGS. 9*a*-9*c* and described above (see Table 2). Table 4 depicts the relationship between the exemplary potential protection segments 60, weights, and reachability links 72.

TABLE 4

| Segment (60) | Disjoint Protection Path (52) | Hop Count of Disjoint Protection Path (link weight) | Reachability Link Reference Number (72) |
| --- | --- | --- | --- |
| S-A (60d) | S-D-E-A (52d) | 3 | 72b |
| S-A-B | S-D-E-I-J-K-L-H-G-F-B | 10 | 72f |
| S-A-B-C-T | S-D-E-I-J-K-L-H-T | 8 | 72a |
| A-B (60e) | A-F-B (52e) | 2 | 72d |
| A-B-C | A-M-N-C | 3 | 72e |
| A-B-C-T (60f) | A-F-G-H-T (52f) | 4 | 72c |
| B-C-T (60g) | B-F-G-H-T (52g) | 4 | 72g |

Utilization of the Shortest Path Algorithm on the hypothetical network topology, which may be in the form of reachability graph 70*a* depicted in FIG. 11, produces the shortest path through the reachability graph 70*a* for the segment shared mesh protection of the working path 50. In this example, the shortest path through reachability graph 70*a* is through hypothetical reachability links 72*b* and 72*c*. Therefore, the chosen optimal segments 60 would be segment 60*d* (44-S-48-A) and segment 60*f* (48-A-48-B-48-C-46-T).

Figure 12:
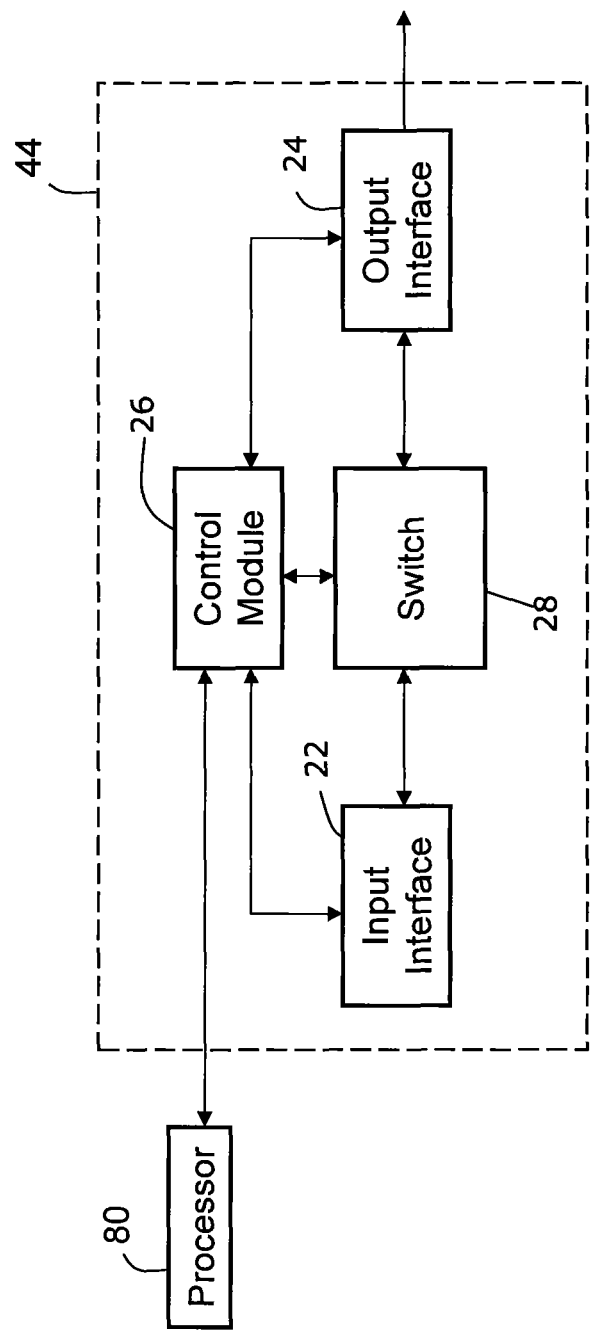
FIG. 12 is a schematic diagram of an exemplary node and external processor.

In one embodiment, one or more processor 80 may carry out the method 100 externally to the source node 44. FIG. 12 is a schematic diagram of an exemplary source node 44 and processor 80. The processor may be any suitable processor and may be located externally to node 44 and/or mesh network 40. One example of a suitable processor 80 is a processor in a network management station. However, it should be understood that the processor 80 may be located anywhere. The processor 80 may execute instructions that cause the processor 80 to perform the method 100. The information produced by the processor may be stored in non-transitory memory (not shown). The processor may provide the information to the source node 44 through the control module 26.

In one embodiment, circuitry of the headend node 44 may generate signals comprising messages and transmit the signal through an output interface 24 of the headend node 44 to an input interface 22 of one or more intermediate nodes 48 to set up the disjoint protection path 52 for the segment 60 in the mesh network 40. The messages may include instructions instructing the intermediate node(s) 48 of the disjoint protection path 52 to reserve mesh network 40 resources for the disjoint protection path 52. Messages may include requests to share mesh network 40 resources for the disjoint protection path 52. Messages may include instructions for configuring nodes 20, time slot information, multiplexing information, and the like.

Circuitry of the headend node 44 may generate additional signals comprising additional messages and transmit the signals through an output interface 24 of the headend node 44 to input interfaces 22 of the nodes 20 in the working path 50 and the nodes 20 in the protection paths 52 of the optimal segments 60. The additional messages may include communications informing the nodes 20 of the network topology based on the identified optimal segments 60.

In accordance with the present disclosure, messages transmitted between the nodes 20 can be processed by circuitry within the input interface(s) 22, and/or the output interface(s) 24 and/or the control module 26. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

It should be understood that the node can be implemented in a variety of manners including those shown and discussed in U.S. Pat. No. 8,223,803, Application No. 20090245289, entitled "Programmable Time Division Multiplexed Switching" the entire content of which is hereby incorporated herein by reference.

Additionally, it should be understood that this method may be applied to any protection or protection scenario for any mesh network.

CONCLUSION

Conventionally, methods of determining protection paths in mesh networks are inefficient and likely to utilize more resources of the mesh network than necessary. Additionally, the conventional methods cannot be efficiently applied to large scale networks. For example, conventional methods may cause substantial time delays as calculation time increases exponentially with the size of the mesh network.

In accordance with the present disclosure, a method is described to determine segments for segment shared mesh protection for a connection based on the mesh network condition and topology, with polynomial scalability, and for implementation of such protection.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network.

In addition, information regarding the optical channel data unit label switched paths can be stored and processed in a distributed fashion, or in a centralized fashion. For example, time slot information for the different multiplexing levels within the multiplexing hierarchy can be stored in 'Generalized Label Object' in respective PSB and RSB control blocks (PSB represents 'PATH state' and RSB represents 'RESV state'). The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes. In this situation, the nodes may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

RFC 2328 "OSPF Version 2," Moy, J., The Internet Society, April 1998.

RFC3473 "Generalized Multi-Protocol Label Switching (GMPLS) Signaling Resource ReserVation Protocol-Traffic Engineering (RSVP-TE) Extensions," Berger (Ed.), The Internet Society, January 2003.

RFC3945 Mannie, E., "Generalized Multi-Protocol Label Switching (GMPLS) Architecture", RFC 3945, October 2004.

RFC4379 "Detecting Multi-Protocol Label Switched (MPLS) Data Plane Failures," Kombella, K. and Swallow, G., The Internet Society, February 2006.

RFC 5340 "OSPF for IPv6," Coltun et al., The Internet Society, July 2008.

G.709-v3 ITU-T, "Interfaces for the Optical Transport Network (OTN)", G.709 Recommendation, December 2009.

G.872 ITU-T, "Architecture of optical transport networks", November 2001.

E. W. Dijkstra: "A note on two problems in connection with graphs," Numerical Mathematics, 1:269-271, 1959.

What is claimed is:

1. A method comprising the steps of:

retrieving, by circuitry of a source node in a mesh network, information indicative of topology of the mesh network, the information stored on a non-transitory memory, wherein the source node is a first node in a connection through the mesh network;

identifying from the information, by circuitry of the source node, a working path from the source node to a destination node in the mesh network, wherein the working path carries data through the mesh network when there is no failure in the mesh network;

identifying from the information, by circuitry of the source node, potential protection segments of the working path, wherein a segment is a sub-section of the working path comprising at least two nodes and one communication link on the working path, wherein a potential protection segment has at least one disjoint protection path available for the segment, wherein the disjoint protection path does not use communication links used by the working path;

creating, by circuitry of the source node, a hypothetical network topology comprising the nodes of the working path and hypothetical links between the nodes, wherein each hypothetical link represents one of the potential protection segments identified, wherein the hypothetical links are assigned a weight;

executing, by circuitry of the source node, a Shortest Path Algorithm on the hypothetical network topology to determine a shortest path through the hypothetical network topology;

identifying as optimal segments, by circuitry of the source node, the potential protection segments represented by the hypothetical links determined as being in the shortest path by the Shortest Path Algorithm;

generating, by circuitry of the source node, at least one signal comprising at least one message; and transmitting the signal comprising the message, by circuitry of the source node, through an output interface of the source node, to an input interface of at least one node in the mesh network, wherein the message communicates a need for resources in case of failure of the optimal segment of the working path.

2. The method of claim 1, wherein the hypothetical network topology is in a form of a reachability graph comprising the nodes of the working path and the hypothetical links between the nodes.

3. The method of claim 1, wherein identifying potential protection segments of the working path further comprises identifying a number of the potential protection segments such that the hypothetical network topology has a number of hypothetical links that form a path between the source node and the destination node.

4. The method of claim 1, wherein the at least one signal is a first signal, and further comprising:

generating, by circuitry of the source node, at least one second signal comprising at least one message; and transmitting the second signal comprising the message, by circuitry of the source node, through the output interface of the source node, to input interfaces of nodes in the disjoint protection paths of the optimal segments and to input interfaces of nodes in the working path, wherein the message communicates information indicative of network topology based on the optimal segments identified.

5. The method of claim 1, wherein the weight assigned to the hypothetical link is indicative of at least one of hop count, bandwidth, cost, length, or latency of the link, of the disjoint protection path of the potential protection segment represented by the hypothetical link.

6. The method of claim 1, wherein the Shortest Path Algorithm is an algorithm that provides a shortest path between a first node and a second node on the topology of the mesh network.

7. The method of claim 1, wherein the Shortest Path Algorithm is Dijkstra's Algorithm or Bellman Ford's Algorithm.

8. The method of claim 1, further comprising executing, by circuitry of the source node in the mesh network, a graph search algorithm to determine network topology of the mesh network including the working path of a first connection through the mesh network.

9. A node, comprising:
one or more input interface;
one or more output interface; and
one or more control module controlling the input interface and the output interface, the control module adapted to:
receive information indicative of identified optimal segments, the identified optimal segments determined by creating a hypothetical network topology of a mesh network having nodes and an identified working path, wherein the identified working path carries data through the mesh network when there is no failure in the mesh network, the hypothetical network topology comprising the nodes of the identified working path and hypothetical links between the nodes, wherein each hypothetical link represents an identified potential protection segment having at least one disjoint protection path available for a segment of the identified working path, the segment being a sub-section of the identified working path comprising at least two nodes and one communication link on the identified working path, and the disjoint protection path not having communication links used by the identified working path, the hypothetical links being assigned a weight; executing a Shortest Path Algorithm on the hypothetical network topology to determine a shortest path through the hypothetical network topology; and identifying as optimal segments the potential protection segments represented by the hypothetical links determined as being in the shortest path by the Shortest Path Algorithm;
generate at least one signal comprising at least one message; and
transmit the signal comprising the message through the one or more output interface of the node, to an input interface of at least one other node in the mesh network, wherein the message communicates a need for resources in case of failure of the optimal segment of the working path.

10. A node comprising:
one or more input interface;
one or more output interface; and
one or more control module controlling the input interface and the output interface, the control module adapted to:
create a hypothetical network topology of a mesh network having nodes and an identified working path, wherein the identified working path carries data through the mesh network when there is no failure in the mesh network, the hypothetical network topology comprising the nodes of the identified working path and hypothetical links between the nodes, wherein each hypothetical link represents an identified potential protection segment having at least one disjoint protection path available for a segment of the identified working path, the segment being a sub-section of the identified working path comprising at least two nodes and one communication link on the identified working path, and the disjoint protection path not having communication links used by the identified working path, the hypothetical links being assigned a weight;
execute a Shortest Path Algorithm on the hypothetical network topology to determine a shortest path through the hypothetical network topology;
identify as optimal segments the potential protection segments represented by the hypothetical links determined as being in the shortest path by the Shortest Path Algorithm;

generate at least one signal comprising at least one message; and transmit the signal comprising the message through the one or more output interface of the node, to an input interface of at least one other node in the mesh network, wherein the message communicates a need for resources in case of failure of the optimal segment of the identified working path.

11. The node of claim 10, wherein the hypothetical network topology is in a form of a reachability graph comprising the nodes of the working path and the hypothetical links between the nodes.

12. The node of claim 10, wherein identifying potential protection segments of the working path further comprises identifying a number of the potential protection segments such that the hypothetical network topology has a number of hypothetical links that form a path between the node and a destination node.

13. The node of claim 10, wherein the at least one signal is a first signal, and further comprising:
   generating, by circuitry of the node, at least one second signal comprising at least one message; and
   transmitting the second signal comprising the message through the output interface to input interfaces of nodes in the disjoint protection paths of the optimal segments and to input interfaces of nodes in the working path, wherein the message communicates information indicative of network topology based on the optimal segments identified.

14. The node of claim 10, wherein the weight assigned to the hypothetical link is indicative of at least one of hop count, bandwidth, cost, length, or latency of the link, of the disjoint protection path of the potential protection segment represented by the hypothetical link.

15. The node of claim 10, wherein the Shortest Path Algorithm is an algorithm that provides a shortest path between a first node and a second node on the topology of the mesh network.

16. The node of claim 10, wherein the Shortest Path Algorithm is Dijkstra's Algorithm or Bellman Ford's Algorithm.

17. The node of claim 10, further comprising executing a graph search algorithm to determine network topology of the mesh network including the working path of a first connection through the mesh network.

18. A system comprising:
at least one processor executing instructions that cause the processor to:
   create a hypothetical network topology of a mesh network having nodes and an identified working path, wherein the identified working path carries data through the mesh network when there is no failure in the mesh network, the hypothetical network topology comprising the nodes of the identified working path and hypothetical links between the nodes, wherein each hypothetical link represents an identified potential protection segment having at least one disjoint protection path available for a segment of the identified working path, the segment being a sub-section of the identified working path comprising at least two nodes and one communication link on the identified working path, and the disjoint protection path not having communication links used by the identified working path, the hypothetical links being assigned a weight;
   execute a Shortest Path Algorithm on the hypothetical network topology to determine a shortest path through the hypothetical network topology;
   identify as optimal segments the potential protection segments represented by the hypothetical links determined as being in the shortest path by the Shortest Path Algorithm; and
a node comprising:
   one or more input interface;
   one or more output interface; and
   one or more control module controlling the input interface and the output interface, the control module adapted to:
      receive from the processor, information indicative of the identified optimal segments;
      generate at least one signal comprising at least one message; and
      transmit the signal comprising the message through the one or more output interface of the node, to an input interface of at least one other node in the mesh network, wherein the message communicates a need for resources in case of failure of the optimal segment of the identified working path.

* * * * *